(12) United States Patent
Vestergaard Frandsen et al.

(10) Patent No.: US 12,012,341 B2
(45) Date of Patent: Jun. 18, 2024

(54) WATER PURIFICATION DEVICE

(71) Applicant: Vestergaard SA, Lausanne (CH)

(72) Inventors: Mikkel Vestergaard Frandsen, Lausanne (CH); Daniel Frauchiger, Prilly (CH); Jean-Luc Madier de Champvermeil, Divonne les Bains (FR); Jean-Marc Pascal, Voreppe (FR); Luc Stoops, Tilburg (NL)

(73) Assignee: LIFESTRAW SARL, Lausanne (CH)

( * ) Notice: Subject to any disclaimer, the term of this patent is extended or adjusted under 35 U.S.C. 154(b) by 317 days.

(21) Appl. No.: 17/364,940

(22) Filed: Jul. 1, 2021

(65) Prior Publication Data

US 2021/0340029 A1 Nov. 4, 2021

Related U.S. Application Data

(63) Continuation of application No. 15/134,760, filed on Apr. 21, 2016, now Pat. No. 11,053,141.

(51) Int. Cl.
| | | |
|---|---|---|
| *C02F 1/44* | (2023.01) | |
| *B01D 61/18* | (2006.01) | |
| *B01D 63/02* | (2006.01) | |
| *B01D 65/02* | (2006.01) | |
| *C02F 1/00* | (2023.01) | |

(Continued)

(52) U.S. Cl.
CPC ............ *C02F 1/444* (2013.01); *B01D 61/18* (2013.01); *B01D 63/02* (2013.01); *B01D 65/02* (2013.01); *C02F 1/002* (2013.01); *B01D 2313/10* (2013.01); *B01D 2313/12* (2013.01); *B01D 2313/16* (2013.01); *B01D 2313/20* (2013.01); *B01D 2313/24* (2013.01); *B01D 2313/50* (2013.01); *B01D 2313/90* (2013.01); *B01D 2321/04* (2013.01); *C02F 1/006* (2013.01); *C02F 1/50* (2013.01); *C02F 1/688* (2013.01); *C02F 2201/005* (2013.01);

(Continued)

(58) Field of Classification Search
None
See application file for complete search history.

(56) References Cited

U.S. PATENT DOCUMENTS

| | | | |
|---|---|---|---|
| 956,982 | A | 5/1910 | Lasrich |
| 3,260,366 | A | 7/1966 | Duff |

(Continued)

FOREIGN PATENT DOCUMENTS

| | | |
|---|---|---|
| CN | 1131936 A | 9/1996 |
| CN | 2551327 Y | 5/2003 |

(Continued)

OTHER PUBLICATIONS

E.S.P. Water Products; Website Advertisement for The Outback Water Purification System for Emergency Preparedness, Survival, Camping; pp. 1-5; 2013.

*Primary Examiner* — Jason M Greene
*Assistant Examiner* — Eric J McCullough
(74) *Attorney, Agent, or Firm* — Cermak & McGowan LLP; James Creighton Wray; Malcolm K. McGowan

(57) ABSTRACT

A device (1) for purification of water driven by gravity through a purification unit between an upper dirt water container (2) and a lower clean water tank (3). A backwash system may be integrated, the system comprising a receptacle (8) for accumulation of the backwash water to prevent consumption thereof by mistake.

6 Claims, 20 Drawing Sheets

(51) Int. Cl.
   *C02F 1/50*   (2023.01)
   *C02F 1/68*   (2023.01)
(52) U.S. Cl.
   CPC .. *C02F 2201/007* (2013.01); *C02F 2301/043* (2013.01); *C02F 2303/16* (2013.01)

(56) References Cited

U.S. PATENT DOCUMENTS

| | | |
|---|---|---|
| 3,281,108 A | 10/1966 | Lewis |
| 3,342,334 A | 9/1967 | Soriente |
| 3,428,177 A | 2/1969 | Duff |
| 3,709,362 A | 1/1973 | Lindstol |
| 4,282,366 A | 8/1981 | Eudy |
| 4,389,311 A | 6/1983 | La Freniere |
| 4,749,484 A | 6/1988 | Greenhut |
| 4,759,474 A | 7/1988 | Regunathan |
| 4,800,018 A | 1/1989 | Moser |
| 4,906,466 A | 3/1990 | Edwards |
| 4,978,449 A | 12/1990 | Devine |
| 5,057,214 A | 10/1991 | Morris |
| 5,151,175 A * | 9/1992 | Royal .................. B01D 29/663 137/107 |
| 5,281,309 A | 1/1994 | Greene |
| 5,322,625 A | 6/1994 | Rise |
| 5,389,384 A | 2/1995 | Jooste |
| 5,954,869 A | 9/1999 | Elfersy |
| 5,955,869 A | 9/1999 | Rathmann |
| 5,959,014 A | 9/1999 | Liebeskind |
| 6,113,815 A | 9/2000 | Elfersy |
| 6,120,587 A | 9/2000 | Elfersy |
| 6,159,363 A | 12/2000 | Collins |
| 6,402,949 B1 | 6/2002 | Banks |
| 6,436,283 B1 | 8/2002 | Duke |
| 6,454,941 B1 | 9/2002 | Cutler |
| 6,469,120 B1 | 10/2002 | Elfersy |
| 6,528,472 B2 | 3/2003 | Charaf |
| 6,551,609 B2 | 4/2003 | King |
| 6,632,805 B1 | 10/2003 | Liebeskind |
| 6,638,426 B1 | 10/2003 | Fritter |
| 6,712,121 B2 | 3/2004 | Clark |
| 6,729,739 B2 | 5/2004 | Siegel |
| 6,762,172 B1 | 7/2004 | Elfersy |
| 6,827,874 B2 | 12/2004 | Souter |
| 6,838,005 B2 | 1/2005 | Tepper |
| 6,924,325 B2 | 8/2005 | Qian |
| 6,981,516 B1 | 1/2006 | VanOsdol |
| 7,276,169 B2 | 10/2007 | Marioni |
| 2005/0258108 A1 | 11/2005 | Sanford |
| 2006/0144781 A1* | 7/2006 | Carlson .................. B01D 61/20 210/473 |
| 2006/0175262 A1 | 8/2006 | Martin |
| 2008/0290025 A1* | 11/2008 | Johnson ................ C02F 3/1273 210/636 |
| 2009/0032455 A1 | 2/2009 | Tada |
| 2010/0051527 A1 | 3/2010 | Frandsen |
| 2010/0193424 A1* | 8/2010 | Scharstuhl .............. C02F 1/003 210/321.61 |
| 2010/0276347 A1* | 11/2010 | Cui ........................ C02F 1/002 210/97 |

FOREIGN PATENT DOCUMENTS

| | | |
|---|---|---|
| CN | 1792304 A | 6/2006 |
| CN | 1994537 A | 7/2007 |
| DE | 3828008 A1 | 3/1990 |
| EP | 0241995 A1 | 10/1987 |
| EP | 0245585 A2 | 11/1987 |
| EP | 0404573 A2 | 12/1990 |
| EP | 1647527 A1 | 4/2006 |
| GB | 1112072 A | 5/1968 |
| JP | S635763 A1 | 1/1988 |
| JP | 2005313163 A | 11/2005 |
| WO | 2004089520 A1 | 10/2004 |
| WO | 2008067817 A2 | 6/2008 |
| WO | 2008110166 A1 | 9/2008 |
| WO | 2008110167 A1 | 9/2008 |
| WO | 2008110172 A2 | 9/2008 |
| WO | 2009019592 A2 | 2/2009 |
| WO | 2009047492 A1 | 4/2009 |

* cited by examiner

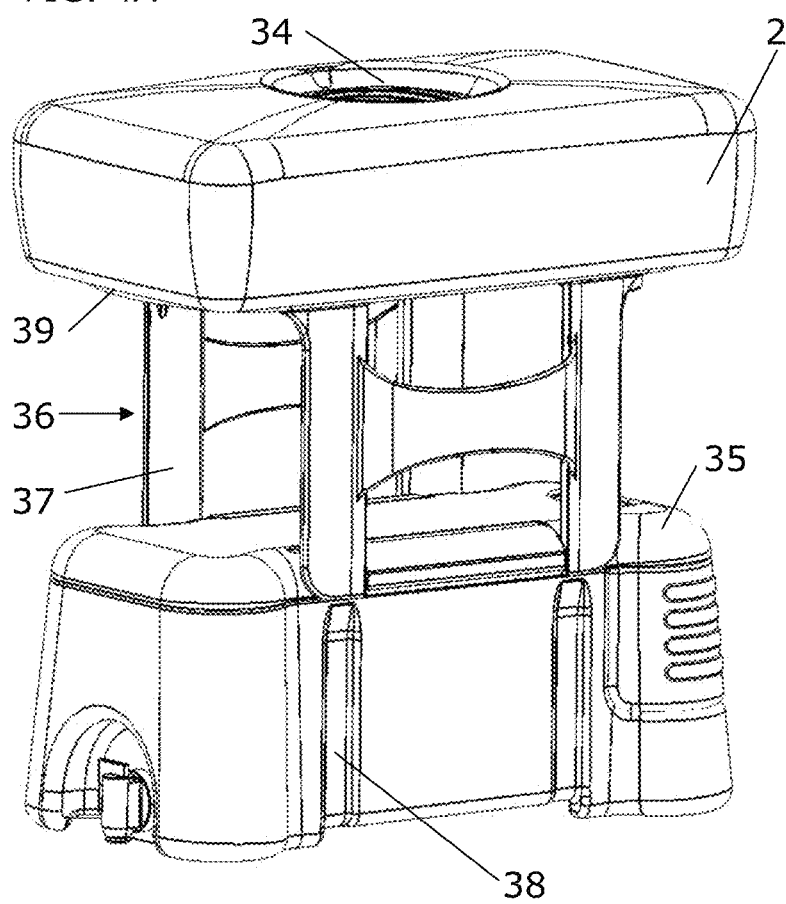

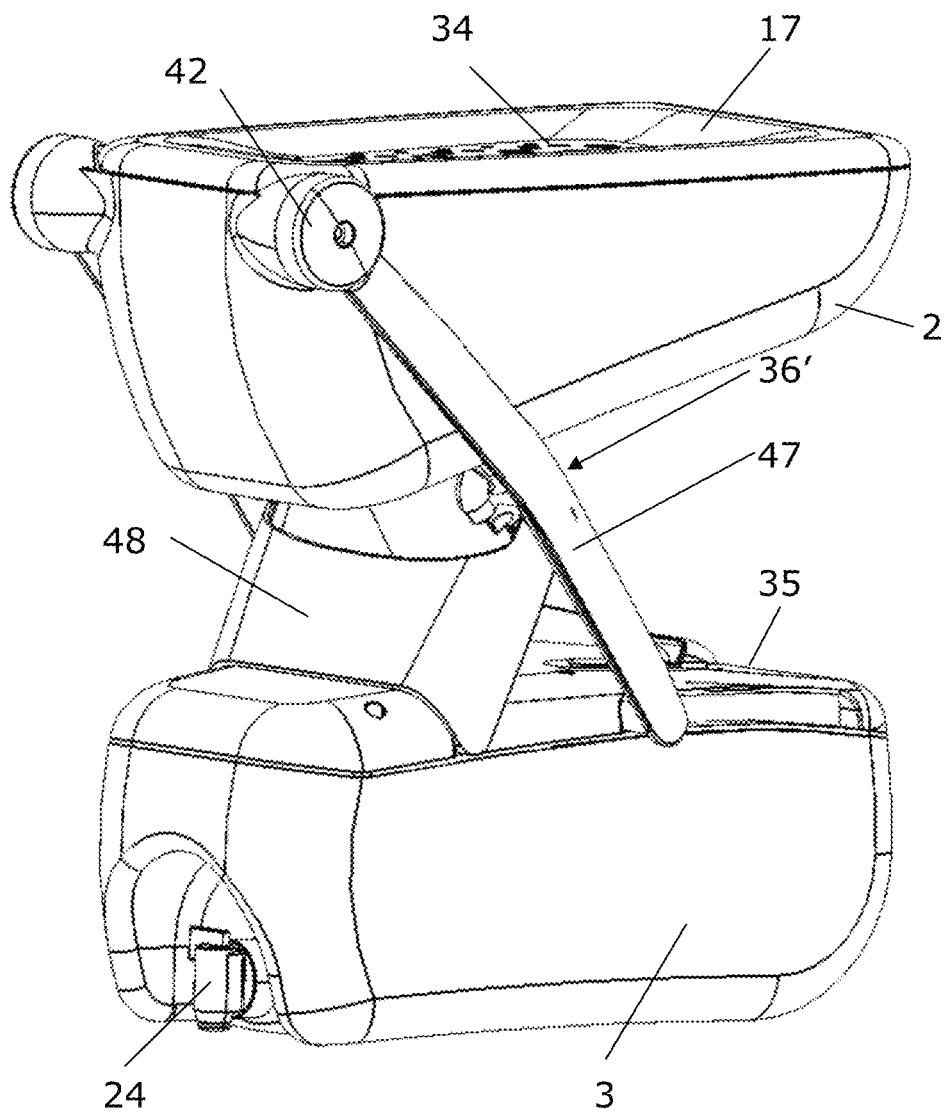

WATER PURIFICATION DEVICE

This application is a continuation of application Ser. No. 15/134,760 filed Apr. 21, 2016, which is a continuation of application Ser. No. 14/064,413 now U.S. Pat. No. 9,352,252 issued May 31, 2016, which is a continuation-in-part of International Application PCT/DK2011/050132 with an international filing date of Apr. 27, 2011.

FIELD OF THE INVENTION

The present invention relates to water purification devices. Especially, it relates to water purification devices with a filtration membrane and an upstream dirt water container.

BACKGROUND OF THE INVENTION

Portable purification devices with serially arranged antimicrobial resins and air-tight membrane filters suffer from the fact that air may be trapped between the resin and the membrane which blocks for a proper flow of water through the system. For this reason, water purification systems have been developed with vent conduits that provide a passage into atmosphere from the volume between the resin and the membrane.

An example is disclosed in U.S. Pat. No. 6,454,941 for a gravity filter with a resin in a compartment above a membrane that formed as a vertically oriented cellular honeycomb structure. An air vent conduit extends from the volume between the resin and the filter membrane up to the upper edge of the resin below water inlet cap. Water in the device cannot by mistake be driven all the way up to the air vent conduit exit, because a goose-neck conduit for water consumption has its water exit below the air vent conduit exit, and water would leave that conduit first.

Another example is published in U.S. Pat. No. 6,638,426 for a gravity filter with a vent tube that is provided above a filter that has vertically arranged, hollow membrane fibres. The vent tube extends centrally through an upper resin chamber and ends higher than the top water inlet above the resin. The vent tube extends from a lower, tangential fluid divider, which has a form of an inverted funnel. The fluid divider has apertures for water to flow down from the resin through the apertures and into the housing with the filter.

These systems have dedicated means for venting the volume above the membranes. Other water purification systems are disclosed with vent tubes extending through an upper dirt water container to above the water level in the dirt water container. Examples are given in U.S. Pat. Nos. 4,749,484, 4,978,449, 4,759,474, 4,800,018, and EP404573. Alternative systems with vent tubes outside the dirt water container are disclosed in GB1112072, U.S. Pat. No. 3,709,362, EP245585, U.S. Pat. No. 5,281,309. Further vent systems are disclosed in DE3828008, U.S. Pat. Nos. 3,281,108, 6,159,363, 7,276,169. As it appears from these disclosures, portable systems have vent tubes extending through the upper dirt water container, whereas for stationary systems, vent tubes that imply air escape from the upstream side of the filter medium can extend through the upper dirt water container or extend outside the upper dirt water container. Thus, there seems to be a systematic limitation for portable devices in this respect, which is due to the desired compactness of these devices, although it implies some limitations for the possible design of the portable water filtration devices.

International patent application WO2008/110166 discloses in FIG. 7 a gravity driven water filtration system with an upper dirt water container connected by a tube to a filtration unit. In use, the filtration unit oriented vertically, and air from the filtration unit is exiting in an upward direction through the tube and into the dirt water container against the stream of dirt water from the container. In practice, this is no problem, although for start up, it is more convenient to open a forward flush valve in order to empty the device for air quickly.

If the filtration unit of the system disclosed in FIG. 7 of WO2008/110166 would have a horizontal orientation, air would be trapped in the filtration unit, which is also the reason, why the module has a vertical orientation when in use. However, even in a horizontal orientation, it would be possible to vent the system by opening a forward flush valve during feeding with dirt water from the opposite end. Once air is flushed out of the system, this flush valve could be closed again. An indication that the air is flushed out of the system is the appearance of water at the exit from the flush valve. Thus, also during proper operation in horizontal orientation, air trapping is no problem for operation of this device, in principle.

Due to the relatively easy venting of the system of WO2008/110166 by using the forward flush valve, such a horizontal orientation of the filtration device may be tempting to use in other filtration systems, if space and compactness is a critical issue. Problem occurs however, if such a system is not understood properly by the end user. For example, for the user not familiar with the system, the procedure for air venting may no be obvious, and the user may regard the system as not proper functioning simply due to the fact that air trapped in the system prevents a proper water flow from the clean water exit valve. Also, the forward flush valve may be mistaken as the clean water supply, and the user may consume dangerously contaminated water coming from the dirt water container without having passed the filter membrane. These risks may appear hypothetical at first glance; however, it should be pointed out that such filter systems are used in emergency areas with sometimes hectic activity where a proper training of the user is not always possible due to lack of resources or lack of time. In such situations, the risk for mistakes is high and may cause fatal results for the user The above described system also suffers from the fact that no proper clean water accumulator is provided, which implies a large risk for back-contamination, especially in emergency situations, where cleaning-water is scarce, and the focus is not especially on hygiene.

A portable water purification system for emergency situations is published on the Internet on http://espwaterproducts.com/emergency-preparedness-water-disaster-relief.htm. The system comprises a top dirt water container covered by a prefilter for removing debris and large sediment particles when water is added. The dirt water container contains an iodine tablet for destroying bacteria and virus. Inside the dirt water container, a vertically arranged sediment pre-filter is provided for removing contaminants down to 0.5 microns in size, including cysts. The lid of the clean water tank contains a filter connector that is directly connecting the outlet of the sediment filter to the inlet of a vertically arranged multimedia cartridge which removes industrial and agricultural contaminants as well as chlorine, iodine, and bad tastes and odours. The multimedia cartridge is provided below the lid and inside the clean water tank. The clean water tank is provided with a tap for dispensing of the purified water.

As the lid of the clean water tank is easily removable, contamination of purified water can easily become a problem if the lid is not properly placed, or it is removed in not sufficiently hygienic conditions. The latter is important when knowing that in emergency situations, but also in typical households in Africa's rural countryside, animals mix with humans and may get easily access to the purification system and its surroundings.

A further disadvantage of this system, as well as the systems disclosed in U.S. Pat. Nos. 6,454,941 and 6,638,426 is the fact that a continuous filling of water into the upstream tank leads to an overflow in any downstream part. Thus, the user has to keep track of how much water is in the tank upstream of the filter relatively to how much is in the downstream part in order not to waste water. The latter is an important issue in emergency situations, where water is scarce.

For these reason, there is an ongoing effort to improve portable water filtration systems in the direction of higher safety and user-friendliness, especially in connection with portable filters for use in emergency situations.

DESCRIPTION/SUMMARY OF THE INVENTION

It is therefore the objective of the invention to provide improvements in the art. Especially, it is the purpose to optimize user friendliness and minimize the risk for accidents when using the device. Some of the improvements are related to ease of transport and storage. Other improvements are related to prevention of air trapping in the filtration unit without the necessity of interference by the user, even in cases where the filtration unit is oriented horizontally.

The device comprising a dirt water container for accumulating dirt water, a clean water tank for accumulating purified water, and a purification unit, for example filtration unit, for purifying water from the dirt water container. The purification unit comprises a filter housing enclosing a purifying medium separating an upstream side of the purification unit from a downstream side of the purification unit, such that water inside the purification unit can flow from the upstream side to the downstream side only through the purification medium, for example porous filtration membrane. The upstream side is connected to the dirt water container for receiving dirt water into the upstream side and the downstream side is connected to the clean water tank for dispensing filtered water from the downstream side into the clean water tank. Optionally, the purification unit is arranged outside the clean water tank. The dirt water container is arranged above the purification unit for driving water through the purification unit by gravity. The dirt water container has a container outlet and the filter housing has an upstream inlet to the upstream side, wherein the container outlet and the upstream inlet are fluid-flow-connected by a first flow connector for receiving dirt water from the dirt water container into the upstream side of the purification unit. The device comprises a clean water tank fluid-flow connected to the downstream side through a downstream outlet for receiving filtered water from the downstream side. Optionally, the clean water tank is arranged below the purification unit.

Several options exist for the purifying medium, for example different resins that release antimicrobials. Examples are resins that release chlorine or iodine. Other options are granular activated carbon or other media that capture microbes and other particles. An example of such other adsorptive medium is disclosed in U.S. Pat. No. 6,838,005 by Tepper and Kaledin, where a fibrous matrix contains electropositive adsorptive nano-particles. In this case, alumina nano-fibres are provided in a porous glass fibre matrix filtering microbes by attachment to the nano-fibres. The microbes and anorganic sediments are attracted by the highly electropositive charged alumina and stay permanently, unreleasable in the filter matrix. The purifying medium may also be a combination of several different media, for example halogen resins in combination with activated carbon.

Alternatively, the purification unit is a filtration unit, and the purifying medium comprises a microporous filtration membrane. One preferred option is microporous hollow fibre membranes, for example a bundle of hollow fibre membranes, although other types of microporous membranes can be used as well. This can be combined with one or more of the other above-mentioned media, for example the fibrous matrix contains electropositive adsorptive nano-particles.

A water purification device according to the above has a useful combination of features. In addition, it is useful for forming the basis for the following further improvements, especially for a portable device.

A Vent Tube

One independent improvement concerns easy venting of the upstream side of the filtration unit, for which the following embodiment is useful. In this case, the upstream side of the filtration unit has an upstream outlet in the filter housing for outlet of fluid from the upstream side. A vent tube is connected to the upstream outlet; the vent tube extends upwards, preferably outside the clean water tank, and has a vent opening for venting air from the upstream side into atmosphere. Optionally, the vent tube extends upwards outside the clean water tank, although it can also extend inside the dirt water tank.

The water from the dirt water container will be pressed by gravity through the upstream side of the filtration unit and from the upstream side of the filtration unit into the vent tube. By this action, air will be pressed into the vent tube by the water. Thus, if the vent opening is provided higher than the bottom of the dirt water container, air in the vent tube will be pressed to a height corresponding to the water level in the dirt water container. Thus, only in case of the water level in the dirt water container being higher than the height at which the vent opening is arranged, a siphon effect will cause water to be forced out of the vent opening until the water level in the container has the same height than the height of the vent opening. In order not to lose water unnecessary, the height of the vent opening advantageously is closer to the top of the dirt water container than to the bottom of the dirt water container. Especially, it should be approximately adjusted to the maximum water level in the dirt water container or higher. For example, the vent opening is provided at a reference height, the reference height being at most 5 cm or 2 cm, or even only at most 1 cm, below an upper edge of the dirt water container, although it is also possible to provide the vent hole above the upper edge of the dirt water container.

An option in case of the vent tube extending upwards outside the dirt water container is to attach an upper part of the vent tube to an outer side of the dirt water container.

Backwashing

One independent improvement concerns safety for backwashing of the filtration unit. Thus, in a further embodiment, the device comprises a backwash facility for the membrane filter in the filtration unit. In this case, the device comprises a manually compressible backwash bulb that is fluid-flow connected, advantageously by a flexible hose, to the downstream side for accumulation of clean water for backwash purposes.

Principles of such backwash facilities are generally known, for example from the above mentioned international patent application WO2008/110166. The term "bulb" is used as a general term and comprises the specific embodiments of the bulb being a balloon or a bellow or other resiliently compressible water chambers. A backwash tube is provided which is, for example with a first end, connected to the upstream side for receiving contaminated backflush water from the upstream side of the filtration unit and, for example with an opposite end, connected to a backwash receptacle for dispensing the into the backwash receptacle when water is pressed from the downstream side through the membrane to the upstream side by compression of the backwash bulb and further from the upstream side through the backwash tube into the backwash receptacle. Such a receptacle minimizes the risk for unintended consumption of contaminated backwash water.

Optionally, a lever is provided for compression of the backwash bulb for backwash purposes by operating the lever, for example depression of the lever. In specific embodiments, the lever comprises a rigid lever tube fluid-flow connecting to the backwash bulb with the downstream outlet of the filter housing. In a further embodiment, the rigid lever tube has a first end that is fluid flow connected to the downstream outlet, for example mounted pivotal adjacent to the downstream outlet. The rigid lever tube has an opposite end, remote from the pivotal mounting at the downstream outlet, the opposite and being provided with a handle for operating the lever.

As a further option, the backwash receptacle is provided at a level lower than the filtration unit, which assures a proper flow into the backwash receptacle. An even further option is provided if the backwash tube is connected to the backwash receptacle through a fluid entrance of the backwash receptacle, wherein the fluid entrance is surrounded by multiple holes for preventing drinking therefrom; this improves user safety.

In order for preventing backwash water to be pressed into the dirt water container during backwash, in a further embodiment, a one way check valve is provided between the dirt water container and the upstream side of the filtration unit.

Optionally, the above backwashing improvement is combined with the above independent vent tube embodiment. In case of such a combination, there is the possibility of a further improvement according to the following embodiment, where the backwash tube is an integral part of the vent tube. Thus, there is no need to provide a vent tube as well as a separate backwash tube, but it is sufficient to provide a single tube with a single tube interior that serves both purposes. Optionally, the combined vent and backwash tube has a tube part downstream of the vent opening, which tube part is connected to the backwash receptacle.

Membranes Maintained in Water

A further independent improvement which, optionally, is combined with one or more of the above independent improvements, is presented in the following. In this embodiment, the downstream side is connected to the clean water tank by a downstream outlet which is above the membranes when in proper use for filtration. This prevents emptying of the filtration unit such that the membranes are maintained immersed in water, which is important for polymer membranes, such as hollow fibre membranes, because a drying out can lead to collapse of the membrane pores. For example, the downstream outlet is provided in the upper part of the filter housing. especially in the case, where the filtration unit has a horizontal orientation or an inclination from horizontal of up to 45 degrees or up to 10 degrees, the downstream outlet is placed at a height above the membrane in the filtration unit in order to maintain a water level above the membranes in the filtration unit.

A Distributor

A further independent improvement which, optionally, is combined with one or more of the above independent improvements, is presented in the following. In this case, the improvement concerns a distributor for distribution of water from the downstream side of the filtration unit. For transport of water from the downstream side of the filtration unit and into the clean water tank, the downstream side of the filtration unit is connected to the clean water tank for flow of filtered water from the downstream side in the filtration unit and into the clean water tank. In a further embodiment, this connection is achieved by a distributor. The distributor comprises an inlet channel for receiving filtered water from the downstream side, a first distributor outlet for dispensing filtered water to the backwash bulb, and a second distributor outlet for dispensing water into the clean water tank. Advantageously, the distributor also comprises a one-way check valve arranged between the first distributor outlet and the second distributor outlet for preventing backwash water from the compressible backwash bulb from entering the clean water tank when water is forced backwards through the first distributor outlet due to compression of the backwash bulb. For example, the check valve is a ball valve. Such a valve can be provided in comprising a valve housing containing a ball and with a ball seat in a wall of the valve housing on a side adjacent to the fluid flow connector and remote to the second filter housing outlet.

The distributor is advantageously but not necessarily combined with the backwash lever as described above.

In a further embodiment, the distributor also comprises one-way vent valve for venting air from the sealed clean water tank when water enters the tank from the filtration unit. As the one way valve only allows air to leave the clean water tank when there is more than atmospheric pressure in the clean water tank due to filling of water in the tank, the valve is only open in combination with an outgoing air flow, which prevents dust and microbes to enter the clean water tank. However, in a further embodiment as an additional safety measure, the valve is provided with an air permeable membrane that prevents microbes and dust to back enter the clean water tank. In this case, the valve may, optionally, be a two way valve such that air can enter the clean water tank, when water is dispensed from it through the tap, which further minimizes the risk for back contamination. In an even further embodiment, in order to prevent water escaping though the vent valve in case of overfilling of the clean water tank, the air permeable membrane is a hydrophobic membrane that prevents water to pass the vent valve. Alternatively, in order to prevent water escaping though the vent valve in case of overfilling of the clean water tank, the valve is provided with a water stop, for example including a ball valve that closes the valve when the clean water tank is filled.

Transportation

Further independent improvements which, optionally, are combined with one or more of the above independent improvements and various embodiments above, are presented in the following. In this case, the improvement concerns handling, storage and transportation. These embodiments are of general nature and useful not only for the embodiment where the purification unit is a filtration unit but for embodiments with various types of purification media.

In order for the purification unit to be protected against damage when handling the device, the purification unit is advantageously arranged inside the clean water tank or, alternatively, in a space between the clean water tank and the dirt water container, that is, above the clean water tank and below the dirt water container. The latter configuration gives access to the purification unit, for example in case of replacement, which can be advantageous relatively to the case, where the purification unit is inside the sealed clean water tank.

Advantageously, this space is defined by an intermediate module having cross sectional dimensions in the horizontal plane corresponding to cross sectional dimensions of the dirt water container and the clean water tank. For example, the dirt water container, the intermediate module, and the clean water tank form an integrated three-module system in stacked conditions, where the intermediate module is supported by the clean water tank and, in turn, supports the dirt water container. In order to ease mount and demount of the purification unit, the first fluid flow connector between the dirt water container and the upstream side of the purification unit is a flexible hose.

Some embodiment, especially, good for storage and transport of the device comprise the following improvement. In these cases, the device has a connection between the clean water tank and the dirt water container, the connection comprising means for varying the distance between the clean water tank and the dirt water container. The connection has a first state where the clean water tank and the dirt water container are in a close position, which is a storage or transport state, and the connection has a second state where the clean water tank and the dirt water container are in a remote condition, which is an operational condition for water filtration. For example, the distance between the clean water tank and the dirt water container in the second condition is between 5 cm and 100 cm larger than in the close position.

Such means for varying the distance, optionally, comprises a set of profiles in sliding cooperation with the outer side of the clean water tank or the outer side of the dirt water container or both. For example, the clean water tank has grooves on its outer side which take up the profiles in sliding cooperation. Alternatively, the dirt water container could comprise such grooves.

In an alternative embodiment, the means for varying the distance comprises a rotationally hinged profile with an angle varying relatively to the clean water tank in dependency of the distance between the clean water tank and the dirt water container. For example, the profile is hinged in a first hinge at the clean water tank and is hinged in a second hinge at the dirt water container. Optionally, in addition, the dirt water container has an upper opening which is dimensioned larger than a cross section of the clean water tank in order to partly enclose the clean water tank in storage condition. When this embodiment is combined with the vent tube improvement above, the vent tube advantageously extends upwards inside the dirt water container in order not to get entangled with the other mechanical parts.

Various Embodiments

In the following, various embodiment are described that may be combined with the independent improvements above.

In order to provide sufficient gravity force for driving water through the membrane of the purification unit, in a further embodiment for the device, the dirt water container is arranged above the clean water tank at a distance from the clean water tank of at least 10 cm or at least 20 cm, and, optionally, at most 40 cm or 30 cm. For example, the dirt water container is arranged above the clean water tank and with a clearance of at least 5 cm, or at least 10 cm or at least 20 cm between the clean water tank and the dirt water container. The distance is relatively short with a corresponding low pressure on the purification unit.

Especially in the case of the purification unit being a filtration unit with a microporous filtration membrane, the low gravity pressure implies an advantage, as particulate matter is kept relatively loose on the influent surface of the membrane, making backflush and cleaning easy and prolonging the lifetime of the membrane filter.

Due to the accumulating clean water tank, the flow through the purification unit can be accepted to be rather low, because the device can filter water without interaction and surveillance by the user. For example, the dirt water container is filled in the evening, and the device may filter the water slowly during the night in order to provide a tank full of water the next morning. Even in the case that the dirt water container is filled despite the clean water tank not being empty, in which case there is more water in the dirt water container than acceptable by the clean water tank, this is no problem, because the clean water tank is sealed and the water filtration will stop as soon as the clean water tank is filled.

For example, the device is in the form of a portable device dimensioned to be easily carried by a single human. For example, the portable device has a dry weight of less than 30 kg. In addition, the volume of the dirt water container is, optionally, less than 30 liters. As a further additional option, the volume of the clean water tank is less than 30 litres. However, the invention is not limited to be a portable device and the inventive features apply equally well to a larger facility, for example as a clean water facility for a school, a hotel, or even a community.

The connections between the dirt water container and the purification unit or the connection between the purification unit and the clean water tank may be rigid tubes, however, in order to facilitate assembling the device and for easing mount and demount of the purification unit, the first flow connector is advantageously a flexible hose, although this is not strictly necessary. Optionally, the vent tube is also a flexible tube.

The clean water tank may be provided with an enclosure that can be opened for cleaning. In an alternative embodiment, in order to minimize the risk for back contamination, the clean water tank has an enclosure sealed against the environment. The term "sealed against the environment" means that there are no holes in the enclosure, where dirt or microbes can enter the clean water tank directly from the environment. The term "sealed against the environment" is also valid in view of the tap that is provided with a drain valve for dispensing water from the clean water tank through the tap, because, normally, the tap is closed. In addition, an opening in the clean water tank is necessary for the connection to the purification unit from which clean water is received; although, in principle, there is a connection from the clean water tank through the purification medium, for example membrane, of the purification/filtration unit and through the connection to the dirt water container and out into atmosphere, this connection can also be regarded as sealed, as no dust nor microbes can enter the clean water tank through the membrane. There may be provided further openings, like vent valves, that open to the atmosphere in the environment; however, this kind of opening only occurs in a controlled manner during outflow and possibly inflow of air when water is filled into the clean water tank or released from it. Such valves are also normally closed, thus, preventing entrance of dust and microbes, why also such valves are not in contradiction to the term "sealed against the environment" for the clean water tank. In addition, such valves may comprise an air permeable but not water permeable microporous membrane preventing dust and microbes to pass such openings.

In order to safeguard that the clean water in the clean water tank is not subject to contamination, the clean water tank may be provided with biocidal means. An option is a biocide that is added to the water, for example by a dispenser or by dissolution of a solid agent containing the biocide. Alternatively, or in addition, the clean water tank may comprise a biocidal agent on and/or in the walls of the clean water tank. For example, the inner wall may be provided with a biocide that prevents proliferation of microbes on the inner walls of the clean water tank.

One example of providing the antimicrobial surface is by coating with an antimicrobial substance. A large number of different coatings are available. Examples of antimicrobial organosilane coatings are disclosed in U.S. Pat. Nos. 6,762,172, 6,632,805, 6,469,120, 6,120,587, 5,959,014, 5,954,869, 6,113,815, 6,712,121, 6,528,472, and 4,282,366.

Another possibility is an antimicrobial coating that contains silver, for example in the form of colloidal silver. Colloidal silver comprising silver nanoparticles (1 nm to 100 nm) can be suspended in a matrix. For example, the silver colloids can be released from minerals such as zeolites, which have an open porous structure. Silver can also be embedded in a matrix such as a polymer surface film. Alternatively, it may be embedded in the matrix of the entire polymer of the clean water tank wall during plastic forming processes, typically known as injection moulding, extrusion or blow moulding.

A silver containing ceramic, applicable for the invention, is disclosed in U.S. Pat. No. 6,924,325 by Qian. Silver for water treatment is disclosed in U.S. Pat. No. 6,827,874 by Souter et al, U.S. Pat. No. 6,551,609 by King, and it is known in general to use silver enhanced granular carbon for water purification. Silver coating for water tanks is disclosed in European patent application EP1647527.

Other antimicrobial metals that may be employed in connection with the invention are copper and zinc, which, alternatively or in addition, may be incorporated in an antimicrobial coating. An antimicrobial coating containing silver and other metals is disclosed in U.S. Pat. No. 4,906,466 by Edwards and references therein.

A coating may, in addition or alternatively, comprise titanium dioxide. Titanium dioxide can be applied as a thin film that is synthesized by sol-gel methods. As anatase $TiO_2$ is a photo catalyst, thin films with titanium dioxide are useful on external surfaces that are exposed to UV and ambient light. Also, nanocrystals of titanium dioxide may be embedded within polymers. In addition, silver nanoparticles can be complexed with titanium dioxide for enhanced effectiveness.

For example, a thin film coating may have a thickness as little as a few micrometer. A coating may in addition, or alternatively, comprise a reactive silane quaternary ammonium compound, like it is known from the company AEGIS® under the trademark Microbe Shield™ used for air conditioning. When applied as a liquid to a material, the active ingredient in the AEGIS Antimicrobial forms a colourless, odourless, positively charged polymer coating, which chemically bonds & is virtually irremovable from the treated surface.

Further options include quaternary ammonium coatings, for example polyethylene imine coatings with biocidal quaternary ammonium.

Some antimicrobial substances are able to migrate through polymer matrices. This implies that the coating may contain antimicrobial substances that are continuously renewed due to the migration from the inside of the coating to the surface of the coating. Therefore, in a further embodiment, the material of the wall of the clean water tank is made of a material containing an antimicrobial substance. This antimicrobial substance has the property to migrate from the inside of the material to the surface of the material.

Depending of the technology of coating, an inner wall biocidal surface coating can also be achieved by dipping into a bath. Processes like spraying may be applied of the respective dedicated surface or surfaces.

An additional option that may be incorporated in the clean water tank is an ultra violet (UV) lamp, for example as it is disclosed in US patent application No. 2005/258108. Such a lamp may be used in addition to the biocidal means.

Apart or as an alternative to dispensing antimicrobials in the clean water tank, the clean water tank may be provided with a reservoir releasing nutrients and/or pharmaceuticals to the clean water in the clean water tank. For example, clean water from the purification unit flows into the reservoir and enriches the water by dissolving a slow-soluble matrix inside the reservoir. For example, the matrix contains an agent that is liberated upon dissolution of the matrix. A possibility is water soluble glass that can contain a releasable agent either dissolved in the glass itself or in voids between sintered glass beads.

An example of a membrane filter inside the filtration unit is a ceramic filter or a semipermeable polymer filter for microfiltration or ultrafiltration. For example, the filtration unit comprises a plurality of hollow fibre microporous membranes, optionally with the hollow fibre membranes being arranged in parallel and potted at both ends in a resin or being bend and potted only in one end. An example is given in international patent applications WO2008/110166 and WO2008/110172. Optionally, the hollow fibre membranes have an outer side of the membranes towards the upstream side and the inner side of the membranes towards the downstream side; this is normally called an outside-in flow configuration. Alternatively, the hollow fibre membranes have their inner side towards the upstream side and the outer side towards the downstream side, this is normally called an inside-out flow configuration. The term "microporous" covers microfiltration porosity as well as ultrafiltration porosity.

Advantageously, the membrane filter unit is configured for stopping virus, bacteria and parasites with a size of more than 0.2 microns. For example, hydrophilic membranes are used with a microbe separation layer with a pore size of less than 0.2 microns. Optionally, the filtration unit comprises a microporous membrane, for example a bundle of hollow microporous fibres, having a membrane surface area of between 0.05 and 0.6 $m^2$, for example between 0.1 and 0.3 $m^2$.

As an additional safety measure, a further embodiment comprises an additional filtration or otherwise purifying media downstream of the microporous membrane. An example of this additional filtration medium comprises a fibrous matrix containing electropositive adsorptive nanoparticles. An example of such filtration medium is disclosed in U.S. Pat. No. 6,838,005 by Tepper and Kaledin. In this case, alumina nano-fibres are provided in a porous glass fibre matrix filtering microbes by attachment to the nanofibres. The microbes and anorganic sediments are attracted by the highly electropositive charged alumina and stay permanently, un-releasable in the filter matrix. The lifetime of the filter depends on the level of contaminants in the influent water and the capacity of the filter. Further such matrices are described in WO2008 110167.

For example, a bundle of hollow fibre microfiltration membranes is followed with a fibrous matrix containing electropositive adsorptive nano-particles. Virus not held back by the microfiltration hollow fibre membranes would then be captures by the matrix. The advantage is a higher flow rate as compared to hollow fibres with ultrafiltration capabilities. Also, the matrix would capture microbes and other particles in case that the membrane ruptures or the potting material for the membrane loses its hermitical seal; in view of the matrix being such kind of redundant safety means, a combination of a bundle of hollow fibre ultrafiltration membranes followed by a fibrous matrix containing electropositive adsorptive nano-particles is also useful. Instead of hollow fibre membranes, other microporous membranes can be used in a filtration unit as described. Combinations of microporous filters and a fibrous matrix containing electropositive adsorptive nano-particles are disclosed in WO2008/110166.

An advantageous material for the capillary membranes is a composition comprising PolyEtherSulfone (PES), PolyVinylPyrrolidone (PVP) and zirconium oxide ($ZrO_2$), for example as described in European patent EP 241 995 or in WO2009/019592.

In a further embodiment, the purification unit, for example filtration unit, has a filter housing that is elongate tubular with a longitudinal axis and is oriented with the longitudinal axis within at most 45 degrees or 25 degrees or 10 degrees from a horizontal plane. For example, the purification/filtration unit has a horizontal longitudinal axis or an approximately horizontal axis.

Compactness of the purification unit for portable systems is achieved to a great degree, if the filter housing is a tubular filter housing with relatively small dimensions, for example with cross sectional dimensions having a circumscribed circle with a diameter of 100 mm at most. Another useful dimension of the purification unit is a length of less than 50 cm, for example less than 30 cm.

As an option, the dirt water container may comprise an antimicrobial source, for example a halogen source. A tablet containing releasable chlorine, for example by dissolution or evaporation from a chamber containing such tablet, is one possible option, although also other kinds of dispensers may be used. Non limiting alternatives are micro dosing systems releasing fluidic biocides, for example iodine or chlorine. Other alternatives include resins capable of releasing halogen biocides or biocides based on non-halogenic substances.

Number references in the claims are not intended to limit the scope of the claims.

SHORT DESCRIPTION OF THE DRAWINGS

The invention will be explained in more detail with reference to the drawing, where FIGS. 1A-1D are drawings of the device, where A) illustrates the device in an overview drawing; B) illustrates tube connections; C) shows a cut-away illustration; and D) a view with the dispenser tap;

FIGS. 4A-4D illustrate a telescopic embodiment in A) an overview image and B) an exploded drawing, C) an illustration of the tubing, and D) a cross sectional drawing;

FIGS. 5A-5D illustrate an embodiment with dirt water container connected rotatably relatively to the clean water tank, where A) is an assembly drawing, B) is an exploded drawing, C) shows part of the tubing, and D) shows the device in a collapsed state;

DETAILED DESCRIPTION/PREFERRED EMBODIMENT

Figure 1A:
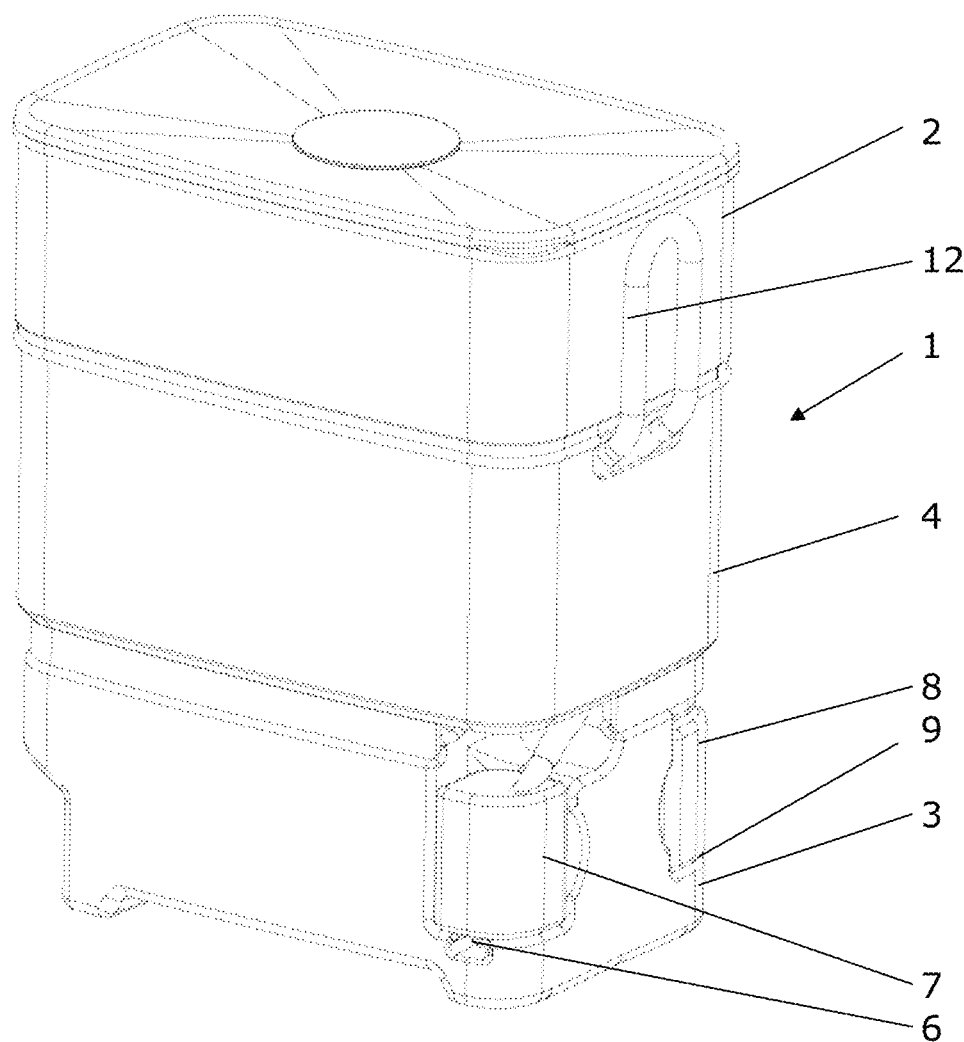
Figure 1B:
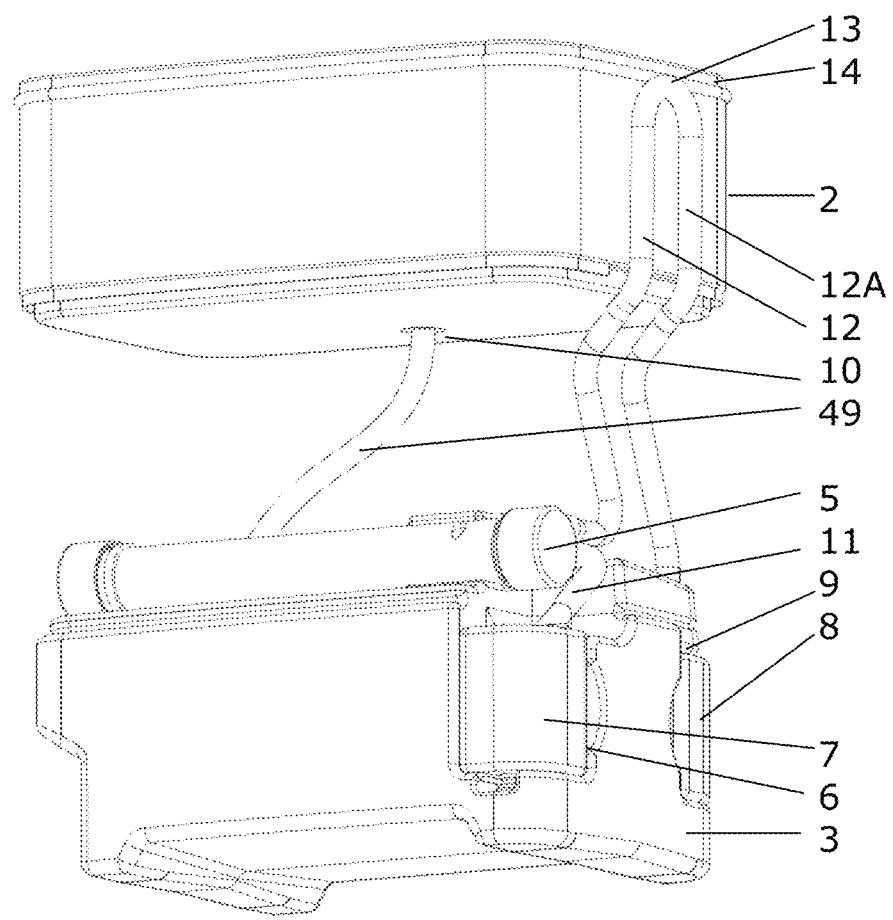

FIG. 1A is a drawing illustrating a device 1 with a dirt water container 2 for accumulating dirt water and a clean water tank 3 for accumulating filtered water. An intermediate module 4 is provided between the dirt water container 2 and the clean water tank 3. This intermediate module 4 defines the distance between the dirt water container 2 and the clean water tank 3 when in stacked conditions as illustrated. In addition, the intermediate module 4 houses a filtration unit 5, which is shown in FIG. 1B, where the intermediate module 4 is removed for sake of illustration. The filtration unit 5 comprises a filter housing 5' enclosing a microporous membrane filter and is on the filter's upstream side fluid-flow connected to the dirt water container 2 for receiving dirt water and is on the filter's downstream side fluid-flow connected to the clean water tank 3 for dispensing filtered water into the clean water tank 2. As illustrated, the dirt water container 2 is arranged a distance above the filtration unit 5 for driving water through the filtration unit 5 and into the clean water tank 3 by gravity. Typically, the intermediate module 4 has a height of between 0.1 and 0.4 m.

The clean water tank 3 also has on its outer side a first cavity 6 for accommodating a compressible backflush bulb 7, which during normal operation is filled with clean water and rests inside the cavity 6. For backwash, the backwash bulb 7 may be removed from the cavity 6 and manually compressed, by which water is pressed backwards through the membrane in the filtration unit 5 in order to remove particulate matter and biofilm from the influent surface of the membrane on the upstream side. The pressure generated in the upstream side by the backwash water closes a check valve between the upstream side in the filtration unit 5 and the dirt water container 2 such that the backwash water is not pressed back into the dirt water container 2. Instead, the backwash water is guided from the upstream side by a tube arrangement (shown as 12, 12A in FIG. 1B) into a back wash receptacle 8, which is accommodated in a second cavity 9 in the outer side of the enclosure of the clean water tank 2.

In order to minimize the risk for a user placing a drinking cup in the backwash cavity 9 and filling the drinking cup with backwash water for consumption, the upper part of the backwash receptacle 8 and the housing of the clean water tank 3 may be equipped with an additional valve (not shown) that only opens when the backwash receptacle is properly placed in the backwash cavity 9.

Figure 2:
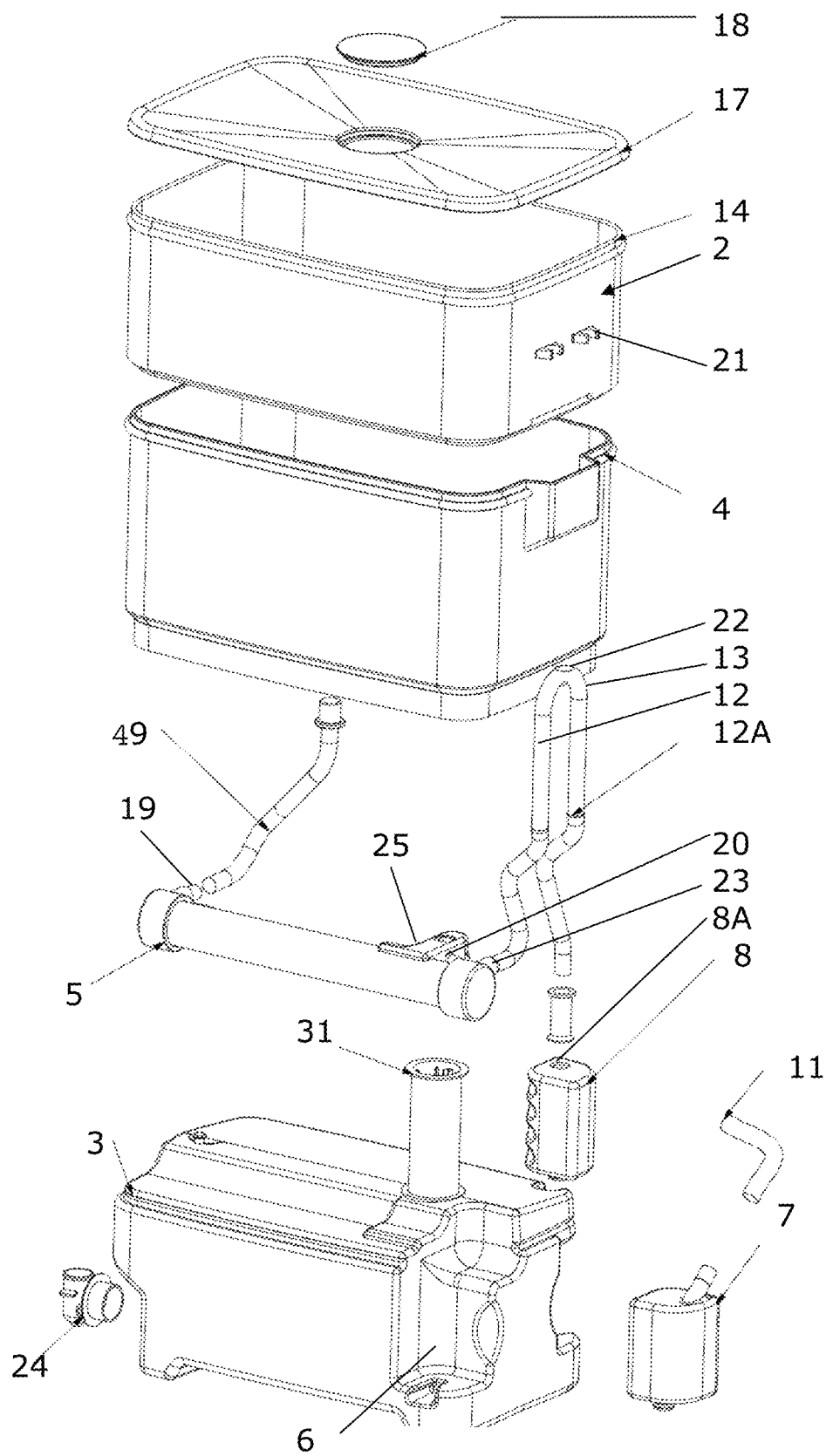
FIG. 2 is an exploded view of the device.
Figure 6:
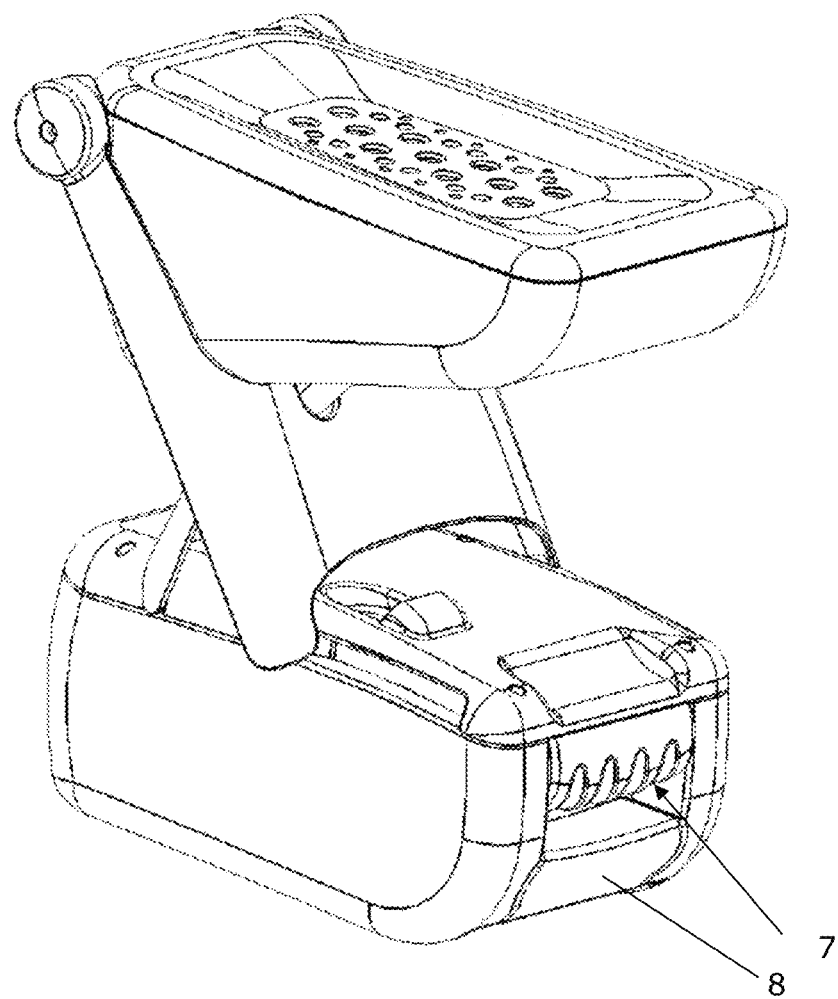
FIG. 6 illustrates an embodiment slightly amended relatively to FIG. 5 with a non-detachable backwash bulb.

As a further precautionary measure, the fluid entrance, reference 8A in FIG. 2 and in greater detail in FIG. 6, of the backwash receptacle 8 is provided with multiple holes 8B around the fluid entrance, making drinking from it extremely difficult, which indicates for the user, that the backwash receptacle is not intended for containing water for consumption.

FIG. 1B is a different drawing without the intermediate module in order to illustrate the tubing. A flexible dirt water tube 49 as a first fluid-flow connector connects a dirt water container outlet 10 with the upstream side of the filtration unit 5. A flexible hose 11 as a third fluid-flow connector connects the backwash bulb 7 with the downstream side of the filtration unit 5. When the backwash bulb 7 is compressed, clean water from inside the backwash bulb 7 is pressed backwards through the membrane into the upstream side in the filtration unit 5 and through upstream outlet 23 out of the housing 5' of the filtration unit 5 and into a flexible backwash tube 12, the distant end of which is connected to the upper part of the backwash receptacle 8 for receiving the backwash water with the particulate and biological matter from the backwash action.

In the case that the microporous membrane filter is a bundle of hollow fibre membrane filters, optionally, the fibres are pottet at both ends and have an inside-out flow for filtration. In this case, biofilm formation and accumulation of particles occurs inside the hollow fibres. Examples of likewise principles are disclosed in WO2008/110166 and WO2008/110172.

Actually, the backwash tube 12 also works as a vent tube in having a vent opening at its uppermost part 13, where it bends. Alternatively, instead of using a single tube for venting as well as for backwash water, two separate tubes may be provided, one for venting and one for the backwash water.

When dirt water from the dirt water container 2 enters the upstream side in the filtration unit 5, air resident on the upstream side of the filtration unit 5 is pressed along the membrane and out of the filtration unit 5 and into the vent tube/backwash tube 12, after which the air in the vent tube 12 is followed by dirt water from the upstream side of the filtration unit 5. The dirt water in the vent tube 12 will rise to the same level as the dirt water in the dirt water container 2. For this reason, the uppermost part 13 with the vent opening in the vent tube 12 should be above the normal maximum level of the dirt water in the dirt water container 2. For this reason, the location of the vent opening is near the upper edge 14 of the dirt water container 2, which is less than 5 cm from the upper edge 14, or rather 1-2 cm from the upper edge 14, as illustrated. However, the uppermost part 13 with the vent opening could also be above the edge of the dirt water container 2.

Figure 1C:
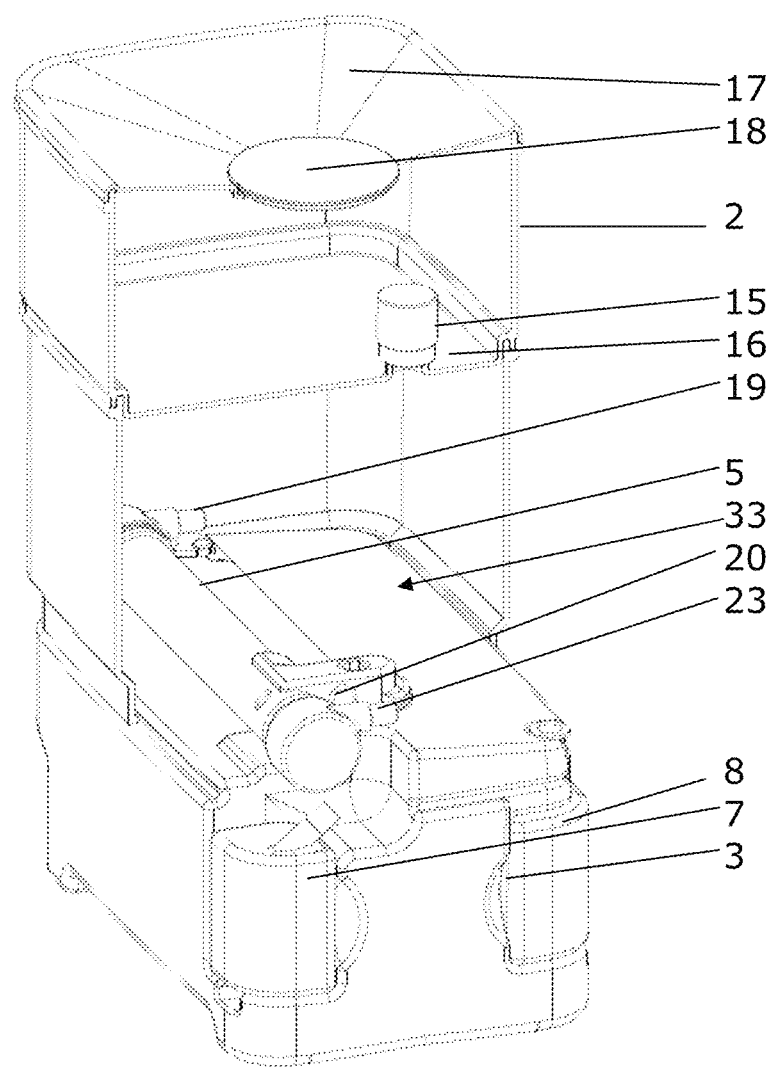

FIG. 1C is a drawing with a cut-away of a portion of the device 1. As illustrated, the dirt water container 2 has an elevated outlet 15, for example 1-3 cm, above the bottom 16 of the dirt water container 2. This way, it is assures that the heaviest particulate matter is collected at the bottom 16 of the dirt water container 2 and prevented from entering the dirt water tube (shown with reference 49 in FIG. 1B) and entering the filtration unit 5 through upstream inlet 19 of the filter housing 5. The dirt water container 2 is covered by a lid 17 which has a sloping surface towards an entrance opening which is closed by a closure member 18. The downwards sloping surface of the lid 17 acts as a funnel when filling water into the dirt water container 2 when the closure member 18 is removed. Also, the lid 17 is removable for cleaning purposes.

The dirt water container 2 may, advantageously, comprise a coarse filter at its fluid inlet. A further option for the device is an antimicrobial source in the dirt water container, for example a halogen source. A chlorine tablet is one option for a halogen source.

As illustrated in FIG. 1C, the clean water tank 3 has an enclosure that is entirely closed and sealed against the environment apart from a tap (shown as reference 24 in FIG. 1D) for dispensing of water from the clean water tank 2 through the tap 24. However, alternatively, it may be provided openable, for example by a lid, in order to give access to the clean water tank for cleaning.

It should be noted that the clean water tank 3 has a sloping upper surface 33 in order not to accumulate water that may have been spilled on the surface 33.

Figure 1D:
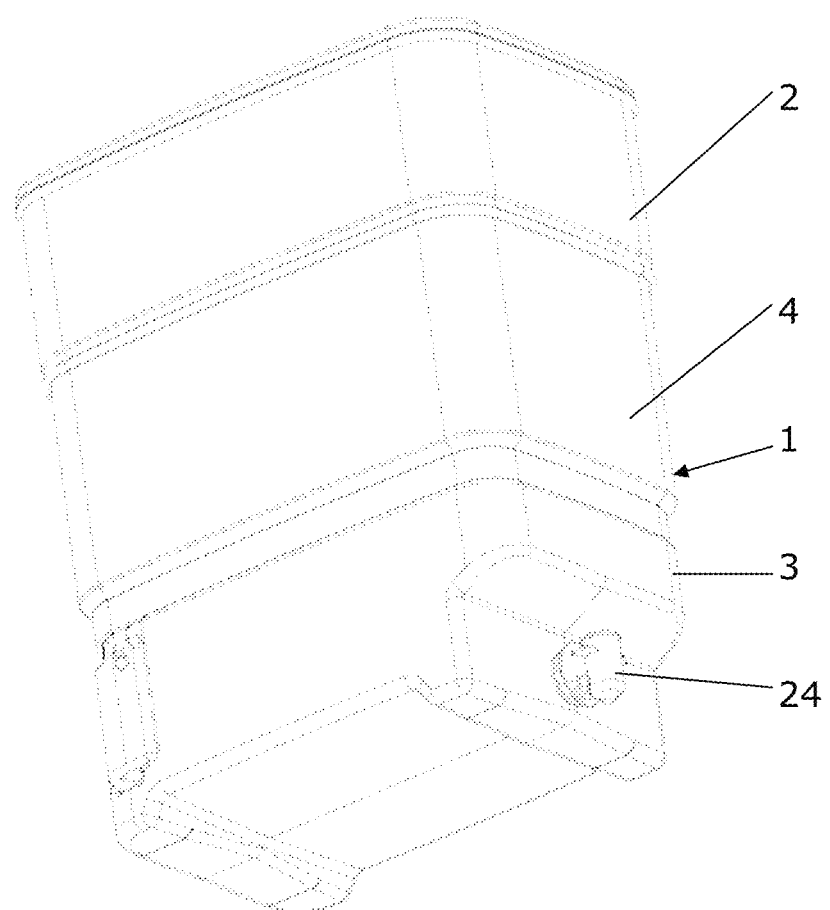

As illustrated in FIG. 1D, the device 1 is compact due to its modular build-up with the mutually stacked dirt water container 2, intermediate module 4, and clean water tank 3. The stacked principle is aesthetically attractive, minimizes accumulation of dirt around the tubing and the filtration unit 5 and also allows an easy cleaning of the device 1.

FIG. 2 is an exploded drawing illustrating some of the above mentioned features in more detail. In addition, is illustrates an agent reservoir 31, in which a source for an agent is added to the clean water in the clean water tank 3. Examples of an agent are nutrients, pharmaceuticals, or antimicrobials, or combinations thereof. This agent reservoir 31 is provided inside the clean water tank 3. Clean water from the filtration unit flows into the agent reservoir 31 and enriches the water by dissolving a slow-soluble matrix inside the agent reservoir 31. For example, the matrix contains an agent that is liberated upon dissolution of the matrix.

In order for microbes not to proliferate inside the clean water tank 2, the internal walls of the clean water tank 2 may be provided with an antimicrobial surface. Non-limiting examples of antimicrobials for such purpose are silver and quaternary ammonium, both having the advantage of being long lasting. Further examples are given in International patent application WO2008/067817.

The dirt water container 2 comprises on its outer side a set of snap-on connectors 21 for the vent tube/backwash tube 12. The vent tube 12 has a vent opening 22 at its uppermost part 13, where it is bent.

A distributor 25 is attached to the upper part of the filtration unit and received water from the downstream side through an opening in the filter housing 5', the opening working as a downstream outlet of clean water. It receives clean water from the downstream side for distribution into the clean water tank 3 and into the backwash bulb 7. It is also configured to prevent the water from the bulb 7 entering the clean water tank 3 during backwash as it comprises a check valve that blocks the fluid passage between the backwash bulb 7 and the clean water tank 3 during backwash.

As it appears from the drawing, the distributor 25 is located attached to the upper side of the filtration unit 25. As the water exits from the downstream side of the filtration unit 5 at the top of the filtration unit 5 above the membrane in the filtration 5 unit, the filtration unit 5 is not drained, thus, minimizing the risk for drying out of the porous membrane in the filtration unit 5, which is important for polymer membranes, such as hollow fibre membranes, because a drying out can lead to collapse of the membrane pores.

For an alternative embodiment, it should be mentioned that the filter housing 5α could also be connected to the distributor 25 through a tube.

Figure 3A:
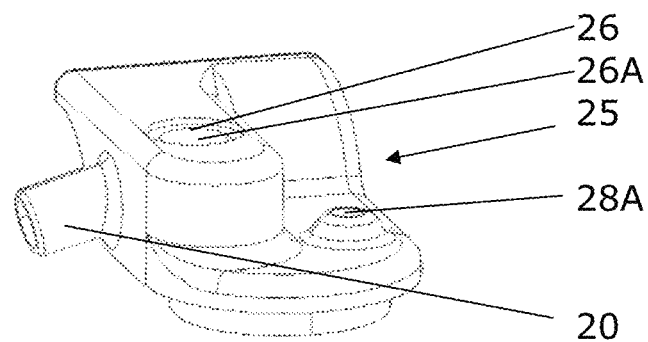
FIGS. 3A-3C illustrate the distributor, where A) is a line drawing of the upper side, B) is a drawing of the lower side, and C) a cross sectional drawing.
Figure 3B:
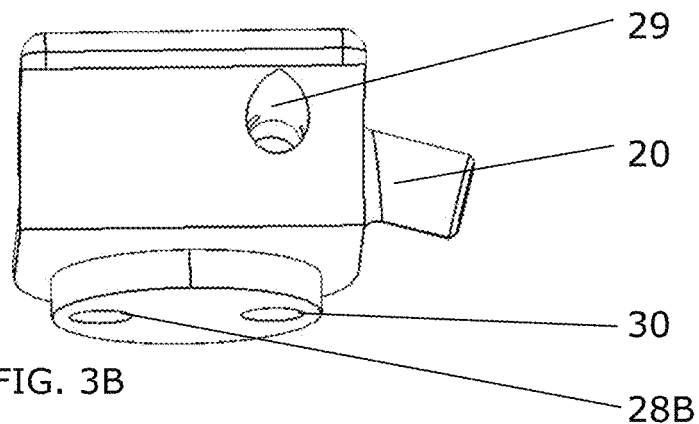
Figure 3C:
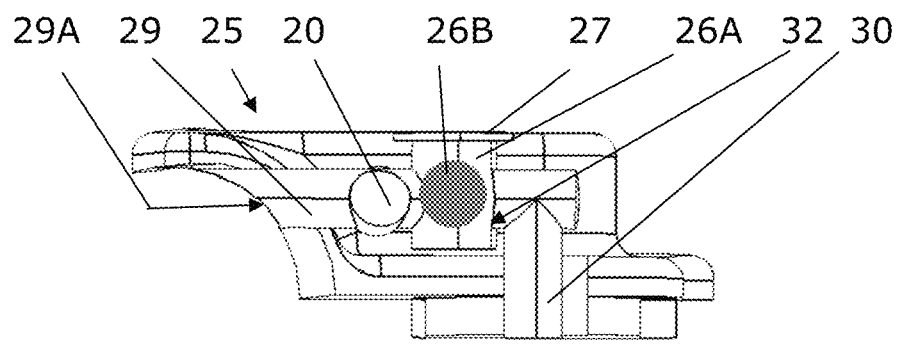

As illustrated in FIG. 3A, the distributor 25 also comprises a vent valve 28A for venting air from the sealed clean water tank 3 when water enters the tank 3 from the filtration unit 5. In FIG. 3B, a vent channel 28B is shown, which received the air and which is in connection with the vent valve 28A. Also shown in FIG. 3B and FIG. 3C is the inlet channel 29 for receiving filtered water from the downstream side through the downstream outlet 29A and into the distributor 25. This filtered water from the downstream side is distributed either through the first distributor outlet 20 for feeding into the backwash bulb 7 or through second distributor outlet 30 for feeding into the clean water tank 3.

As illustrated in FIGS. 3A and 3C, the distributor 25 also comprises a ball valve housing 26 with ball 26B. The opening 26A seen on top of the ball valve housing 26 in FIG. 3A is only used during assembly for placing a ball 31 inside the valve housing 26 and would normally be covered by a plate 27 as illustrated in FIG. 3C. Inside the ball valve housing 26, a ball 26B is provided for sealing against valve seat 32 when pressure is exerted on the ball 26B from pressurised backwash water flowing into the ball valve housing 26 from the backwash bulb 7 backwards through the second filter housing outlet 20.

Under normal operational conditions, gravity forces water from the dirt water container 2 through the membranes in the filtration unit 5 and into the downstream side of the filtration unit 5. From the downstream side of the membrane in the filtration unit 5, filtered water enters the distributor 25 through an inlet channel 29. Through the distributor, the water will first flow into the first distributor outlet 20 and fill the backwash bulb 7 before the water slowly under low pressure flows through the ball valve housing 26A and into the second distributor outlet 30 and further into the clean water tank 3. During this low pressure flow, the ball 26B floats on top of the water in the ball valve housing 26. If the backwash bulb 7 is compressed, the water from the bulb 7 will flow backwards through the first distributor outlet 20 and into the inlet channel 29. As, the compression of the bulb 7 causes a flow speed of the backwash water much higher than the normal flow speed of the water from the filtration unit under normal gravity filtering conditions, the water presses the ball 26B in the ball valve housing 26 against the seat 32, preventing water to enter the second distributor outlet for the clean water tank 2. Instead, the backwash water flows into the downstream side inside the filtration unit 5 and exerts backwash pressure on the membrane for forcing clean water from the bulb 7 backwards through the membrane pores. The ball valve system is a simple arrangement that guides the backwash water to the correct location without the necessity of interference by the user apart from compressing the backwash bulb 7.

When the backwash water is pressed into the downstream side of the membrane in the filtration unit 5 and further backwards through the membrane into the upstream side of the filtration unit 5, a check valve (not shown), for example a corresponding one way ball valve, prevents the backwash water to enter the tube 49 to the dirt water tank 2, see FIG. 2 in this respect. Instead, the backwash water exits the upstream outlet 23 for flowing through backwash tube (vent tube) 12, 12A and into the backwash receptacle 8. The backwash receptacle 8 minimizes the risk of users drinking the backwash water by mistake.

For example, the device of FIG. 3 comprises a selection or all of the following features in combination,
the clean water tank has an enclosure sealed against the environment,
the dirt water container is arranged at least 10 cm above the clean water tank,
the filtration unit is arranged in a space above the clean water tank and below the dirt water container,
the porous filtration membrane is an ultrafiltration membrane or microfiltration membrane,
the membrane is a bundle of hollow microporous fibres;
the space is defined by an intermediate module having cross sectional dimensions in the horizontal plane corresponding to cross sectional dimensions of the dirt water container and the clean water tank,
the intermediate module is supported by the clean water tank and, in turn, supports the dirt water container when in stacked conditions,
the dirt water container, the intermediate module and the clean water tank in such stacked conditions from an integrated three-module system,
the first flow connector comprises a tube,
the filtration unit is oriented with the longitudinal axis within less than 10 degrees from a horizontal plane, and
the device is portable.

Figure 4B:
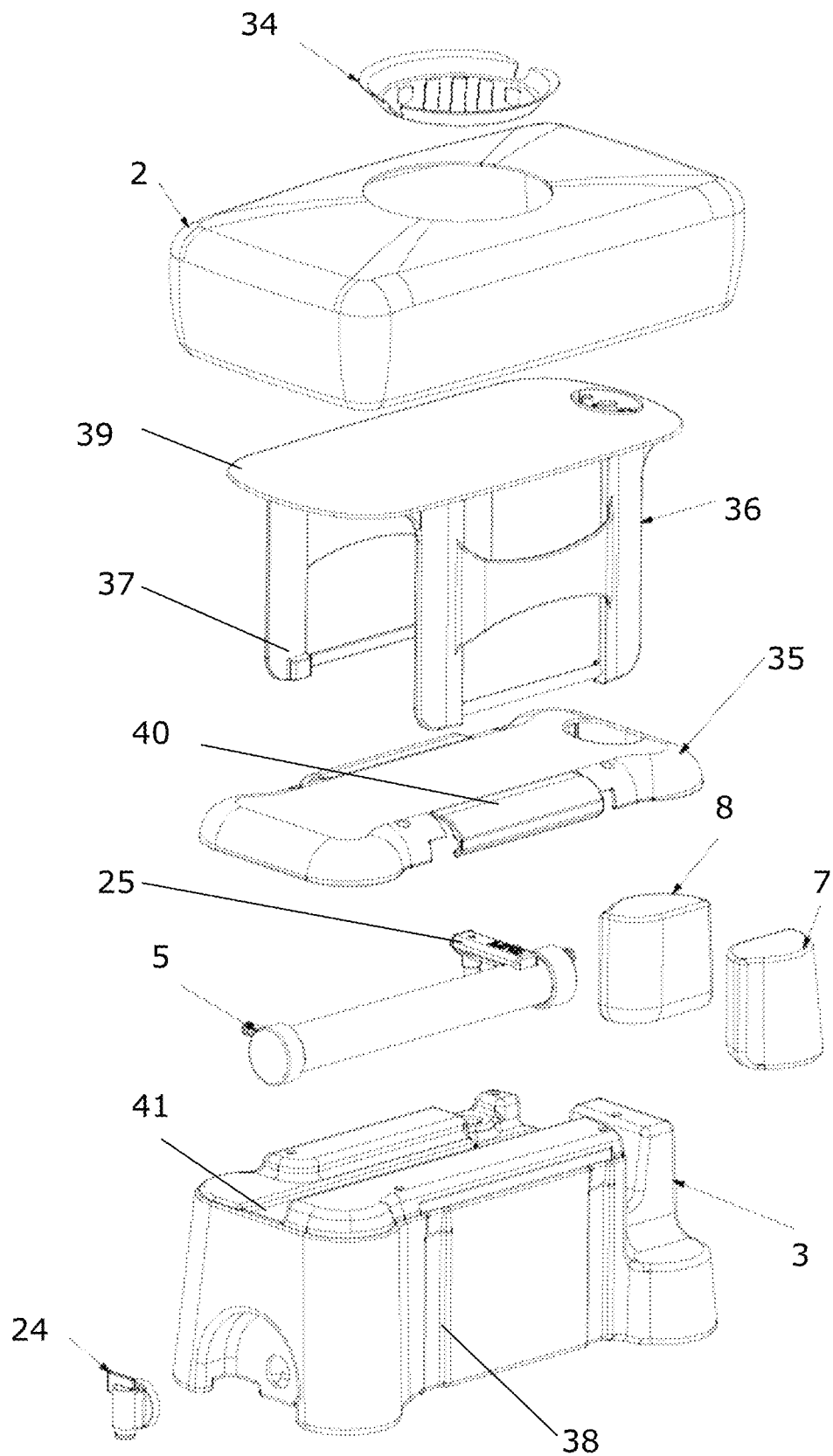

FIGS. 4A and 4B illustrate an embodiment that can be decreased in size for storage or transport. This device comprises a dirt water container 2 and a clean water tank 3 and a filtration unit 5 as explained above, as well as backflush bulb 7 and backwash receptacle 8. As an option, the dirt water container 2 also has an upper coarse filter 34. The filtration unit 5 is inserted into a corresponding compartment 41 and covered by a lid which is fastened to the clean water tank 3 by snap connectors 40.

The dirt water container 2 is connected to the clean water tank 3 by a connector 36. The connector has an upper platform 39 for supporting the dirt water container 2. This connector has profiles 37 that slidingly cooperate with grooves 38 in the outer side of the clean water tank 3 in a telescopic manner By pushing the connector 36 downwards with the profiles 37 sliding in the grooves 38, the platform 39 is lowered until it rests upon lid 35. This is a good position for the connector during storage, because the volume of the device is decreased and it is more stable. For use, the connector 36 with the platform 39 is pulled away from the clean water tank 3 until a maximum height. This height may be secured by a snap lock, for example. The advantage of the greater distance between the dirt water container 2 and the clean water tank 3 is a higher gravity pressure on the water. For portable models of the device as illustrated in FIG. 4, the height of the connector is typically between 10 and 50 cm, for example between 15 and 30 cm.

In a further embodiment, the dirt water container 2 is made of a flexible, collapsible material and can be pressed into a flat structure taking up very little volume, which decreased the volume even further for transport and storage.

Figure 4C:
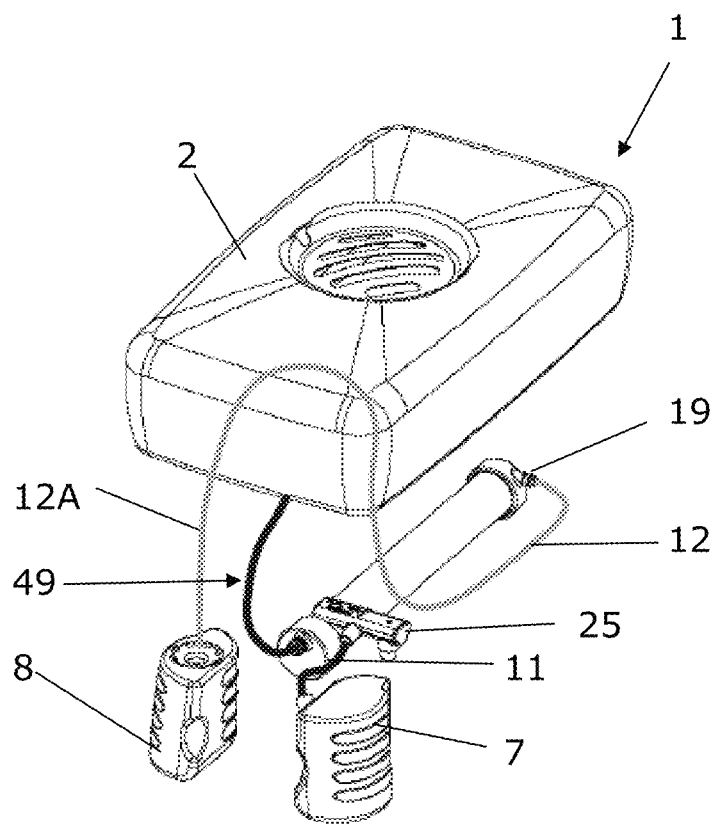

FIG. 4C illustrates the tubing including the dirt water tube 49 from the dirt water container to the filtration unit 5, the vent tube 12 with the extension 12A to the backwash receptacle 8, and the tube between the distributor 25 and the backwash bulb 7.

Figure 4D:
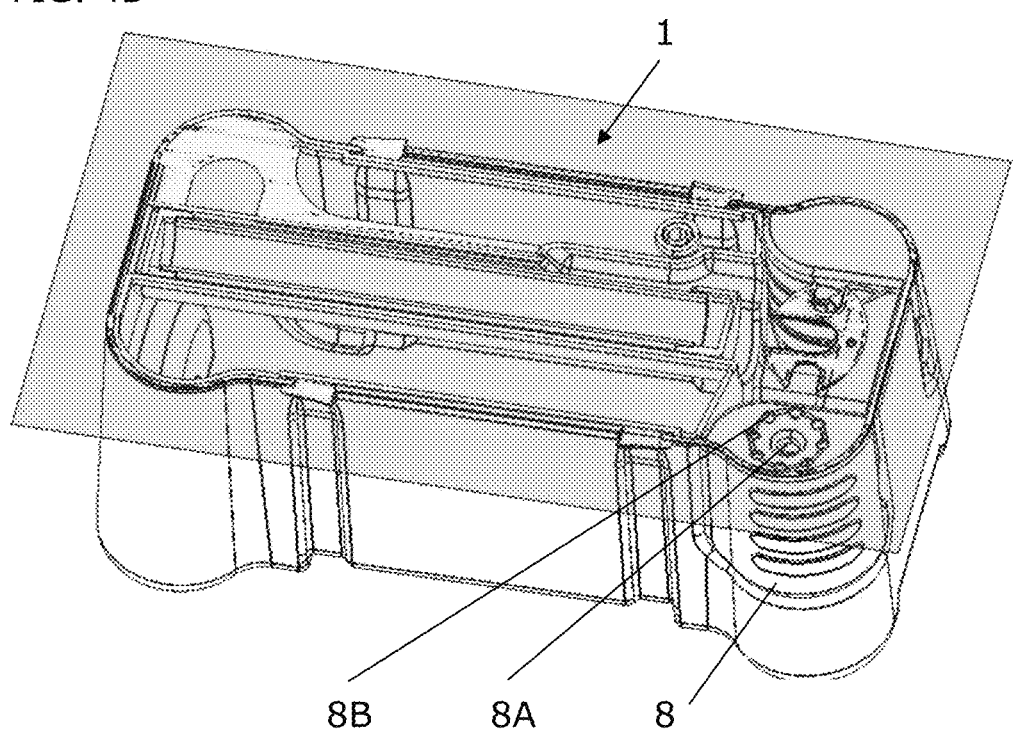

FIG. 4D is a cross sectional drawing of the device 1, which illustrates the backwash receptacle 8 having an opening 8A for receiving backwash water. In addition, it comprises a number of smaller holes 8B around the opening 8A, which makes it difficult to drink from the backwash receptacle 8 and indicates for the user that the water in the backwash receptacle is not intended for consumption. In addition, the opening 8A is provided lower than the upper surface 8C of the backwash receptacle 8, such that it is difficult to pair the opening 8 with lips from a mouth of a user for drinking.

Figure 5B:
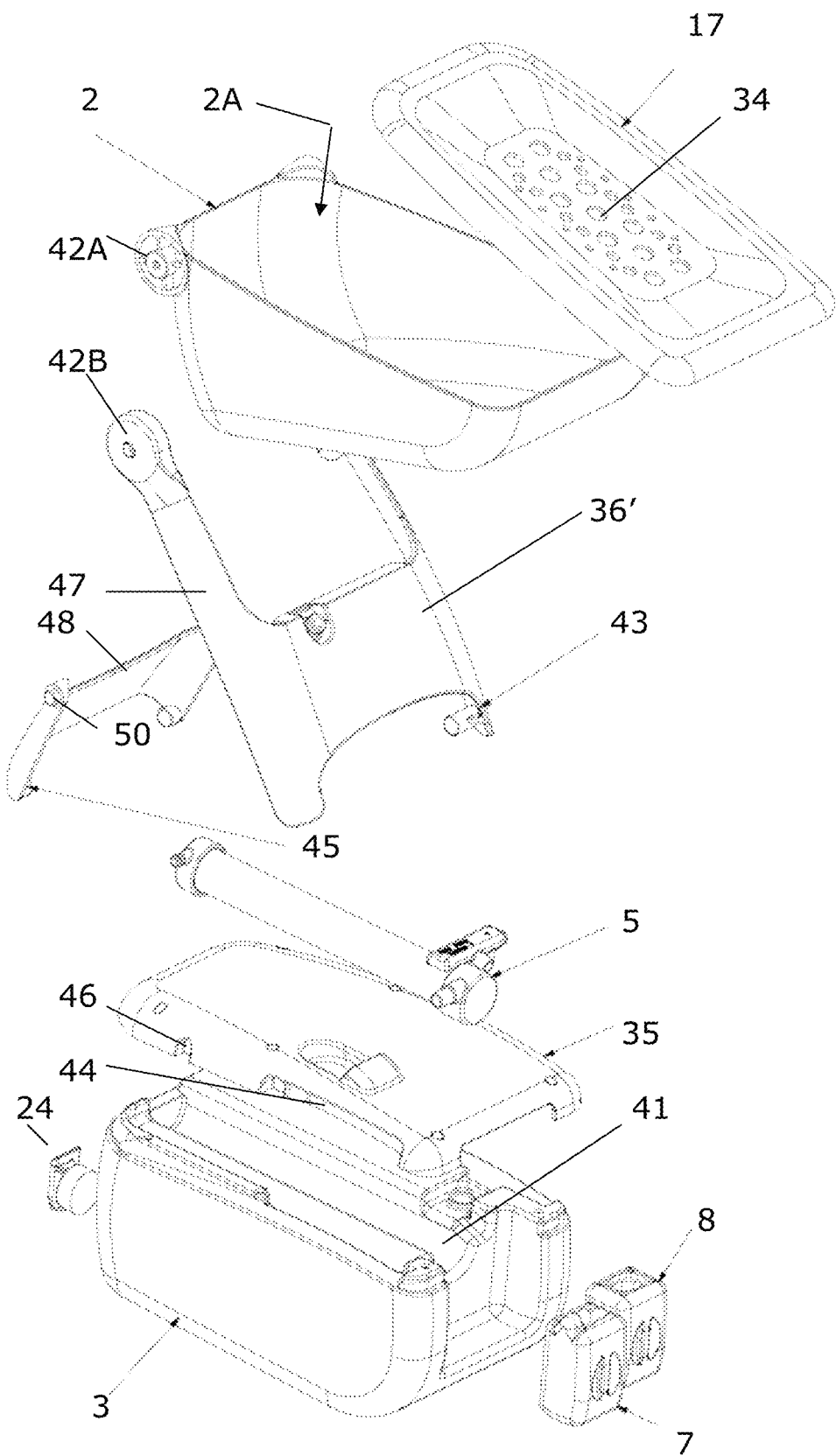
Figure 5C:
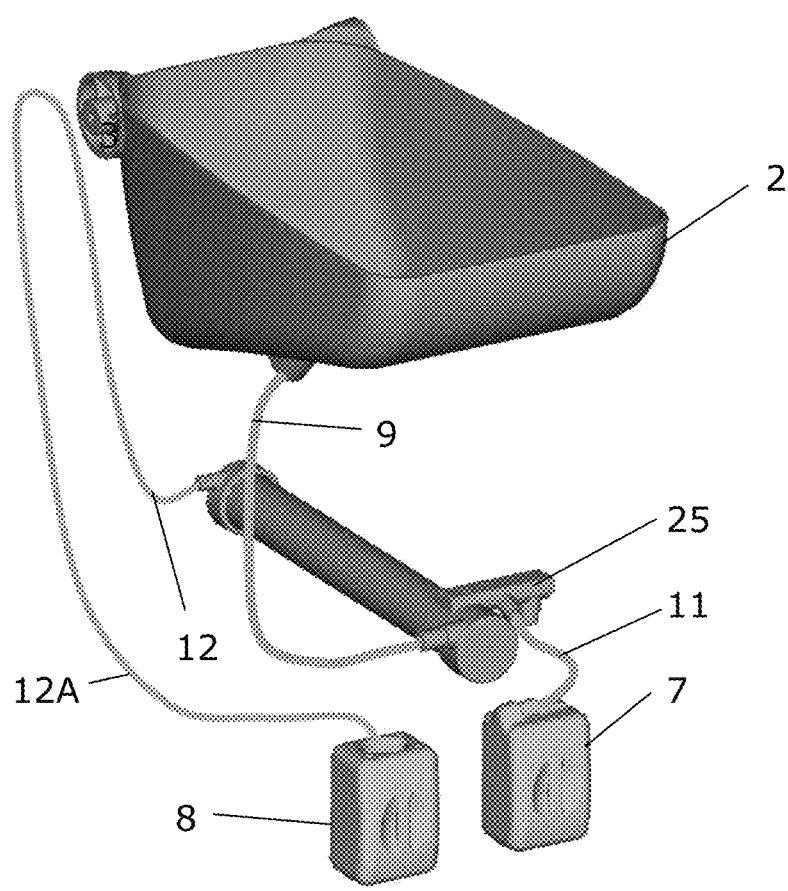
Figure 5D:
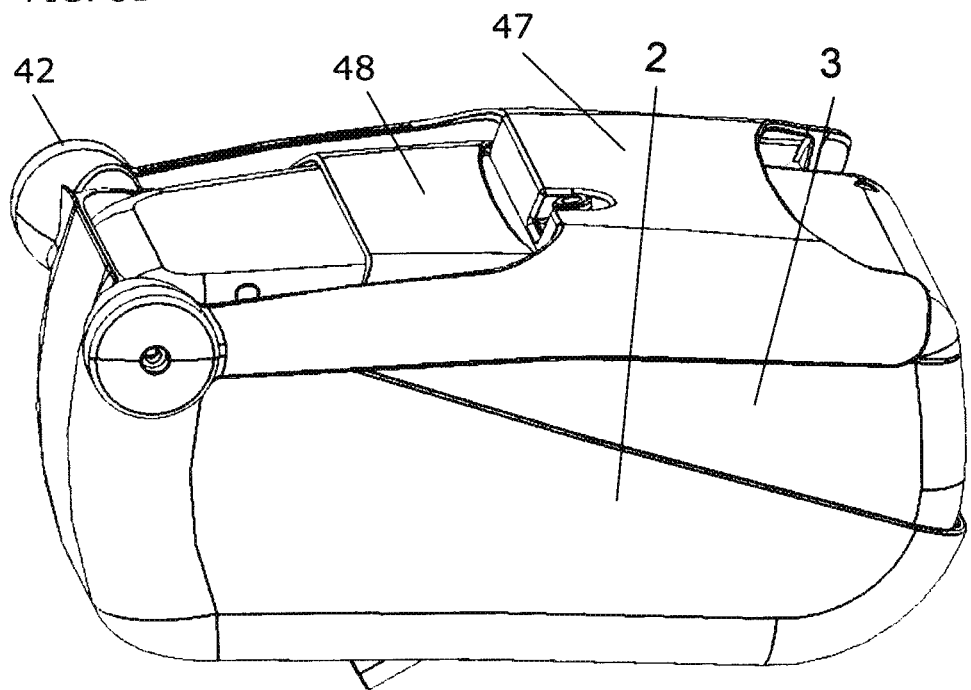

FIG. 5A-D illustrate an embodiment that can be decreased in size for storage or transport. FIG. 5A illustrates an assembled drawing, FIG. 5B an exploded drawing, FIG. 5C illustrates the tubing, and FIG. 5D shows a collapsed state of the device. This device comprises a dirt water container 2 and a clean water tank 3 and a filtration unit as explained above, as well as backflush bulb 7 and backwash receptacle 8. The dirt water container has a lid 17 with a coarse filter 34. The filtration unit 5 is inserted into a corresponding compartment 41. Once the filtration unit 5 inserted into the compartment 41, the clean water tank is covered by a lid 35 which is fastened to the clean water tank 3.

The dirt water container 2 is connected to the clean water tank 3 by a connection 36'. The connection 36' is connected to the dirt water container 2 by first a rotatable hinge 42, best seen in FIG. 5A, with two cooperating hinge parts 42A and 42B, best seen in FIG. 5B, and connected to the clean water container 3 by a second hinge comprising a third hinge part 43 and a sliding groove 44. By rotating the connection 36' in the hinges 42 and due to the third hinge part 43 in cooperating groove 44, the dirt water container 2 is lifted upwards relatively to the clean water tank 3 and can likewise be lowered in order to take up less space. In order to stabilize the connection 36', it comprises two connection parts 47, 48. The second part 48 is hinged by the fourth hinge part in bushing 46. The first and the second connection parts 47 and 48 are also mutually hinged by hinge part 50 and a corresponding cooperating hinge part (not shown) in the second connection part 48.

When the dirt water container 2 is lowered by a scissor action of the two connection parts 47, 48, it may also be rotated in addition around the hinge 42 and, when the lid 17 is removed, through its opening 2A embrace partly the clean water tank 3 in the volume of the dirt water container 2, as it is illustrated in FIG. 5D. This adds to the compactness for storage and transport and protects the tap 24 against transport damage.

In FIG. 5A, the vent tube and the tube connections between the dirt water container 2 and the filtration unit 5 and further to the backwash bulb 7 and the backwash receptacle 8 are not illustrated in detail but are similar to the embodiment in FIG. 1 and FIG. 2. Optionally, also, the distributor as illustrated in FIG. 3 may be applied for the embodiments of FIGS. 4 and 5.

FIG. 5C illustrated the possible tubing for the FIG. 5A embodiment in line with the tubing in the embodiment as explained for FIG. 2, where tubing 49 connects the dirt water container 2 with the filtration unit 5, tubing 11 connects the distributor 25 of filtration unit 5 with the backwash bulb 7, and tubing 12 is a vent/backwash tube extended with tubing 12A into the backwash receptacle 8.

FIG. 6 illustrates a slightly amended embodiment relatively to the embodiment of FIG. 5, where the backwash bulb 7 and the backwash receptacle 8 are differently oriented.

The backwash bulb 7 is fastened permanently to the device such that it is not removable, which simplifies the handling of the device even further, because it can be easily compressed in the shown location.

For example, the devices above comprises a combination of the following features, the clean water tank has an enclosure sealed against the environment, the dirt water container is arranged at least 10 cm above the clean water tank, the filtration unit is arranged in a space above the clean water tank and below the dirt water container, the porous filtration membrane is an ultrafiltration membrane or microfiltration membrane, the porous filtration membrane is a bundle of hollow fibre membranes the intermediate module is supported by the clean water tank and, in turn, supports the dirt water container when in stacked conditions, the first flow connector comprises a tube, the filtration unit is oriented with the longitudinal axis within less than 10 degrees from a horizontal plane, and the device is portable.

Exemplary, non limiting dimensions for the device as described above and according to the claims are as follows. The volumes of the dirt water container and the clean water tank are between 5 and 30 litres or 5 and 20 litres, for example between 8 and 12 litres. The length of the filtration unit is between 10 and 50 cm. The height of the intermediate module is between 10 and 40 cm. In case that a bundle of hollow fibre membranes is used for the filtration unit, the number of fibres is between 50 and 400 and the cross sectional outer diameter of each fibre is between 1 and 3 mm.

It should be mentioned that the above embodiments described in relation to the drawings can be modified by exchanging the filtration unit with other purification units, for example comprising resins for chemical purification as well as adsorption media. In such cases, the aspects of the vent tube and the backwash bulb and receptacle may be avoided, however, keeping the overall technical solution of the interplay between the dirt water container (2), the clean water tank (3) and the intermediate module (4), as described in FIGS. 1 and 2, or the telescopic arrangement as described in FIG. 4, or the rotational means for collapsing the device, as illustrated in FIGS. 5 and 6.

Figure 7A:
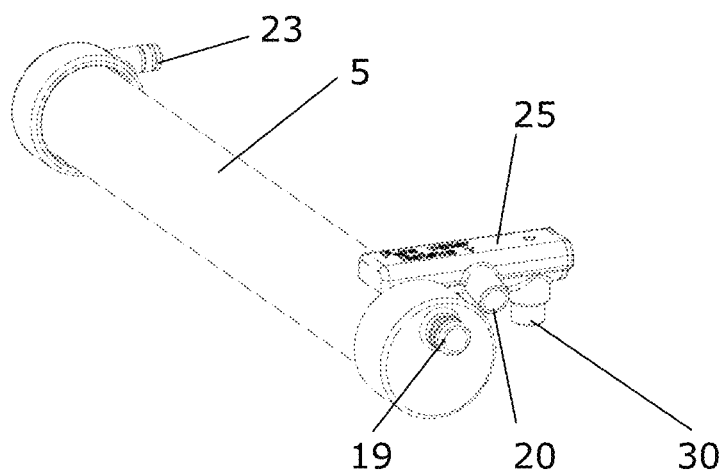
FIGS. 7A-7B show an embodiment of a filtration device in A) a three dimensional drawing and B) a cut-away three dimensional drawing.
Figure 7B:
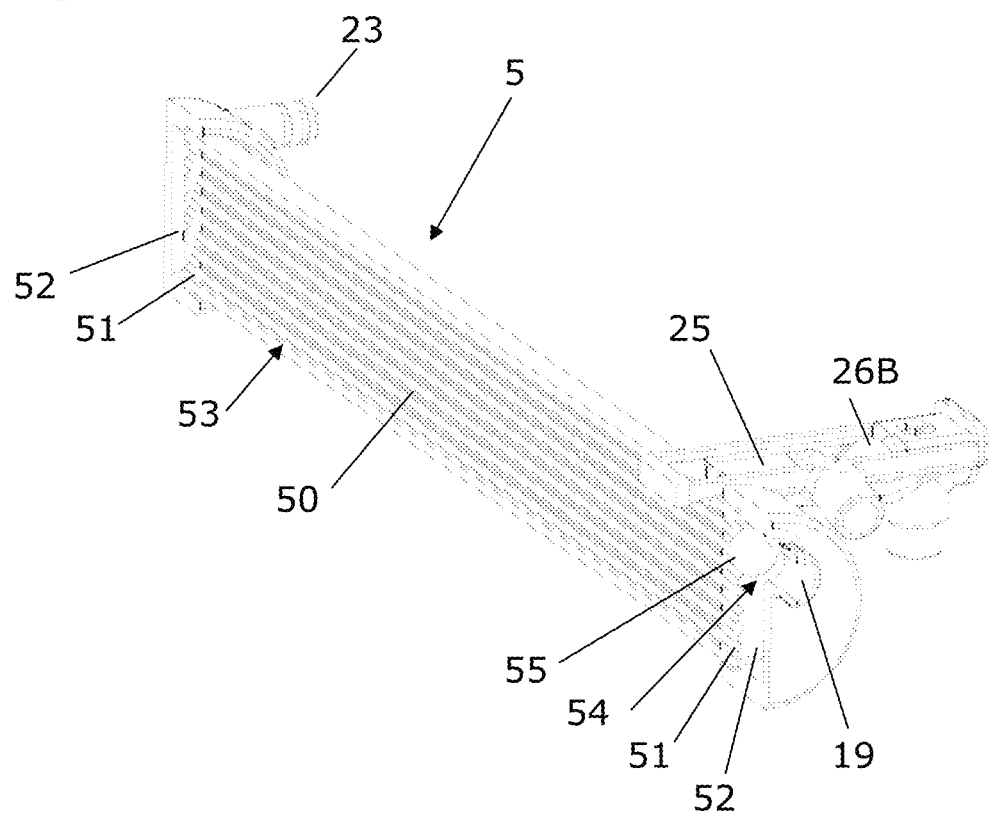

FIGS. 7A and 7B illustrate a possible embodiment for a filtration module 5. The upstream inlet 19 and the upstream outlet 23 are arranged differently that in the embodiment of FIG. 2 but has the same effect. Through the upstream inlet 19, water from the dirt water container (not shown) enters the filtration module 5 into the upstream side 52. Air and water can exit the upstream side 52 through upstream outlet 23. The dirt water is enters the inner channels of the microporous hollow filtration membranes 50, which are potted at both ends in a polymer potting 51, and is filtered in an inside out flow into the downstream side 53. From the downstream side 53, it enters distributor and exits the distributor through first distributor outlet 20 into a backwash bulb (not shown) and through second distributor outlet 30 into the clean water tank (not shown). The distributor's ball valve system with ball 26B is explained in connection with FIG. 2.

During backwash, clean water is pressed backwards through the membrane 50 bundle from the downstream side 53 into the upstream side 54, and the water with the particles that are removed from the hollow fibre membrane 50 bundle leaves the upstream side 52 through upstream outlet 23. A ball valve 54 with ball 55 prevents the backwash water to flow back into the dirt water tank (not shown).

Figure 8A:
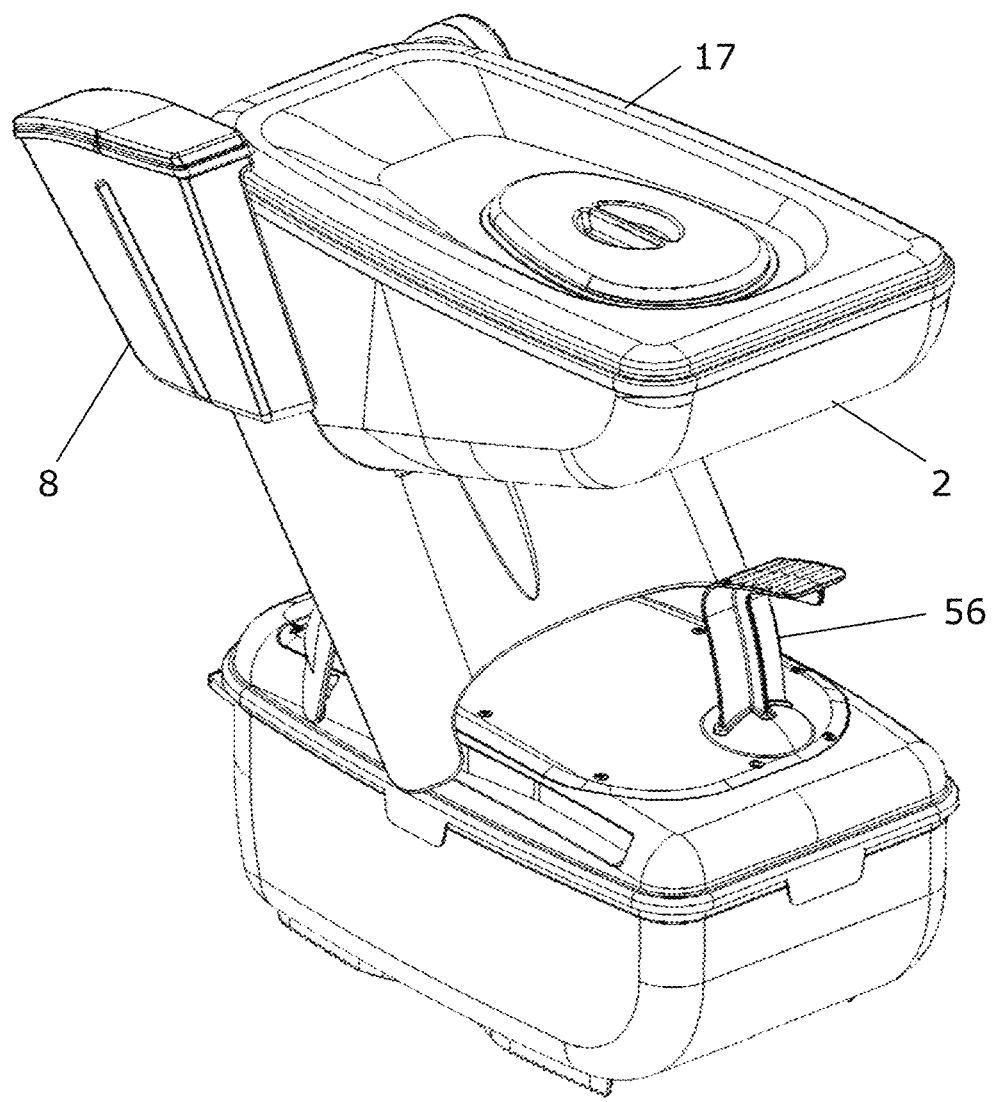
FIGS. 8A-8B show an alternative embodiment with a lever for compressing the backwash bulb, where a) is an overview drawing, and b) shows interior features.
Figure 8B:
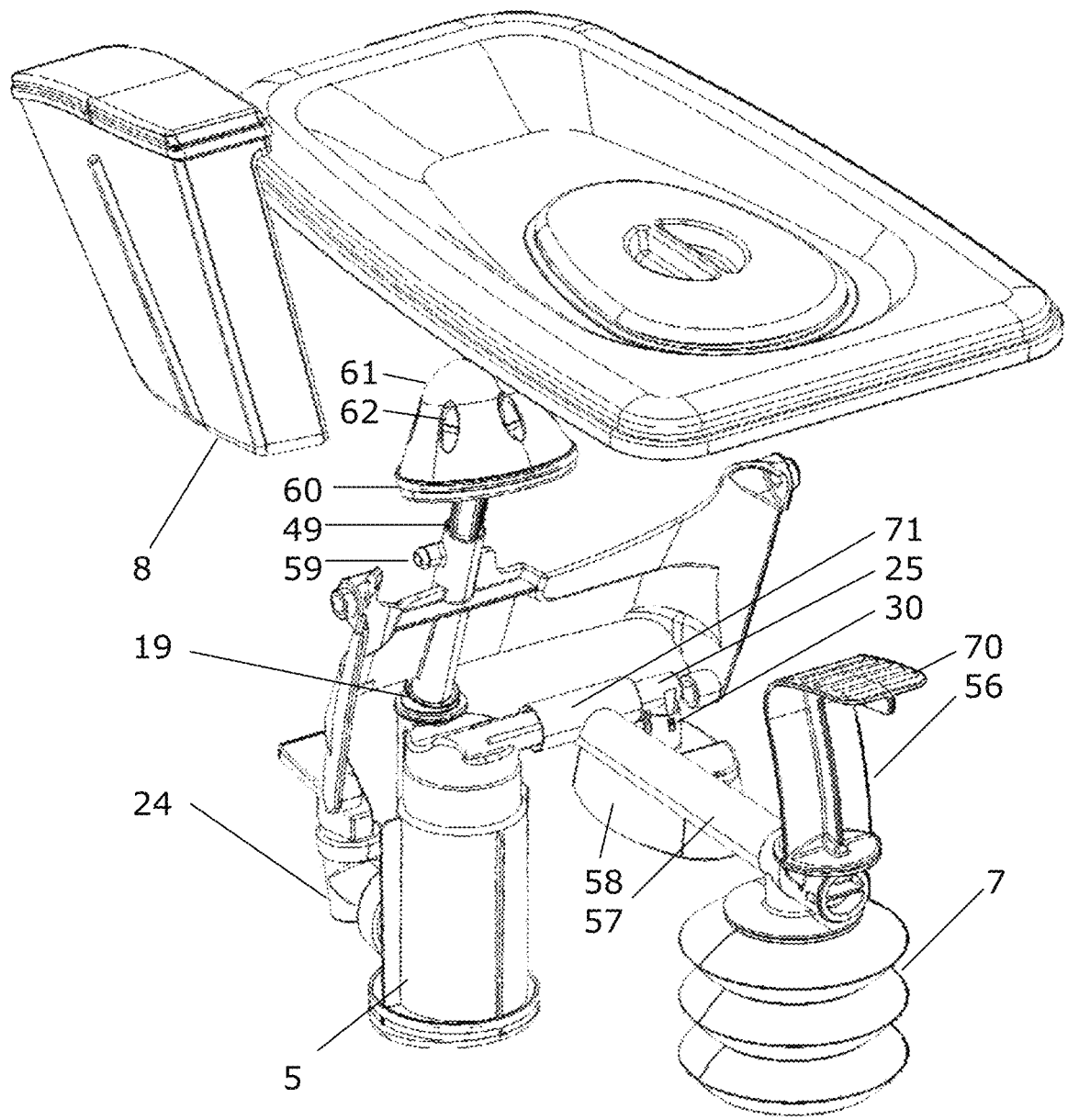

FIG. 8a is a drawing of an alternative embodiment, where the backwash receptacle 8 is provided at the side of the dirt water container 2. A lever 56 is used for backwashing. FIG. 8b shows the interior units in greater detail. The water flow is as follows. Water from the dirt water container 2 enters entrance openings 62 in a cover 61 of an antimicrobial unit 60 for picking up a small concentration of antimicrobials that prevent proliferation of microbes in the filtration unit 5. From the antimicrobial unit 60, the dirt water enters a tube 49 that connects the dirt water container 2 with the upstream inlet 19 of the filtration unit 5. The filtration unit 5 is arranged vertically or at an angle slightly deviating from vertical. However, the filtration unit 5 could also be arranged at a different orientation, for example horizontally or at an angle slightly deviating from horizontally.

Figure 10:
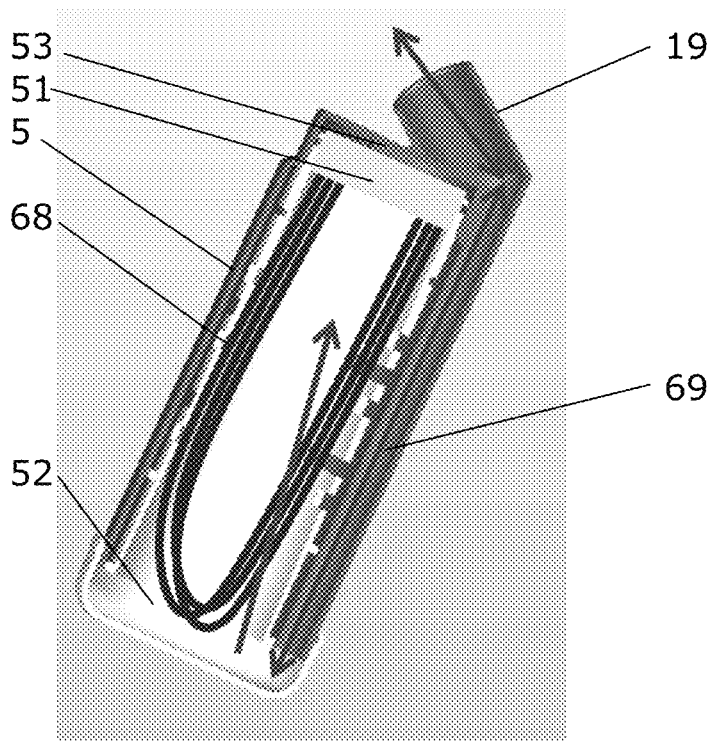
FIG. 10 is a drawing of a filter housing with bent hollow fibre filters.

A non-limiting but useful example of a filtration unit 5 is illustrated in FIG. 10. Water enters the upstream inlet 19 and flows through run-down channel 69 to the bottom of the filtration unit 5. From this upstream side 52, the dirt water enters U-bent hollow membrane fibres 68, which are potted 51 at both ends in a resin. The water enters the membranes 68 outside-in, and from the lumen of the membranes 68, the filtered and clean water is released from the downstream side 53 at the upper end of the filtration unit 5.

Figure 9:
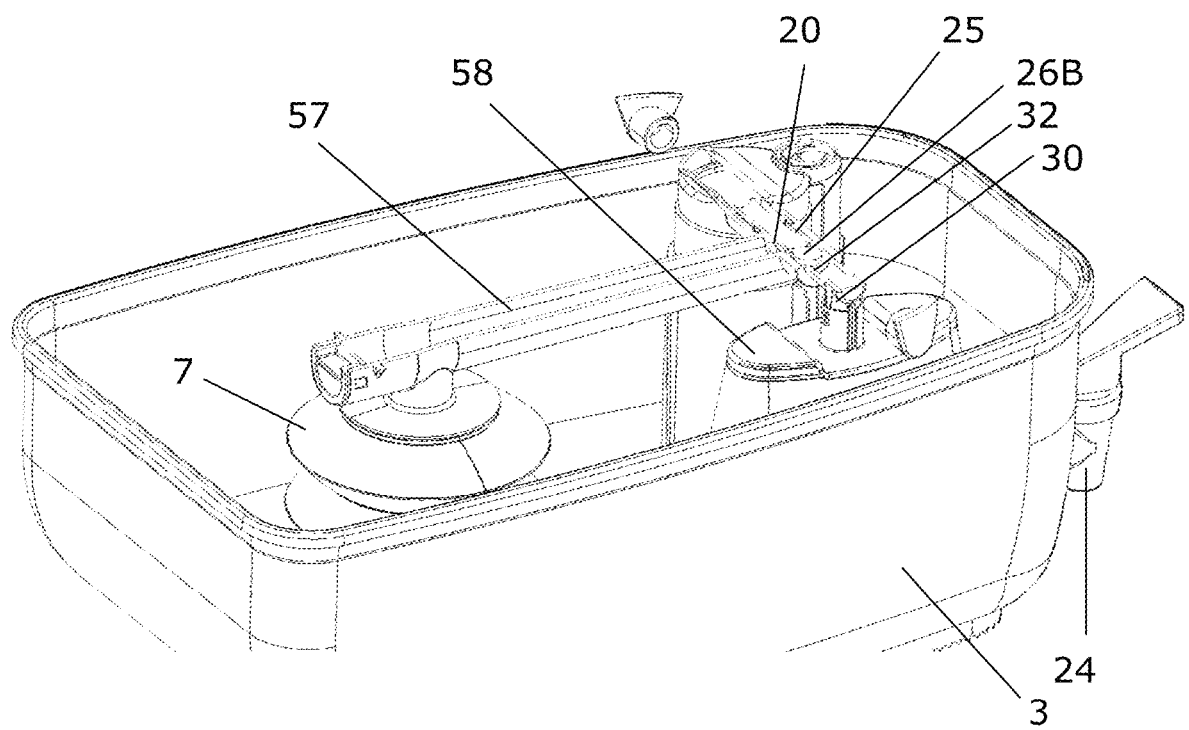
FIG. 9 is a sectional drawing of the alternative embodiment.

As illustrated in FIG. 9, the water flows from the upper end of the filtration unit 5 into the distributor 25 and through first distributor outlet 20 into lever tube 57, which in turn is fluid-flow connected to the backwash bulb 7. Once, backwash bulb 7 is filled with clean water, the clean water from the filtration unit 5 will fill the distributor 25 further, and clean water will flow through the second distributor outlet 30 into the clean water tank 3. Once, the clean water tank 3 is full, a floater 58 will rise and shut off flow from second distributor outlet 30 in order to prevent overfilling of the clean water tank 3. The distributor 25 comprises a ball 26B which will allow water to pass around the ball 26B and into the second distributor outlet 30 if the pressure of the water is low, which means that the water is flowing by gravity force through the system. However, when the bulb 7 is compressed for backwash, the backwash compression raises the water pressure in the distributor 25, and the ball 26B is pressed against the ball seat 32 and will thereby close off the second distributor outlet 30. Instead, the compression of the bulb 7 leads to backwash of the clean water in reverse through the membranes 68 in the filtration unit 5.

Returning to FIG. 8b, the lever 56 for compression of the backwash bulb is illustrated. The lever 56 is has a pivot mount 71 at the distributor 25, adjacent to the upstream inlet 19 of the filter housing 5. The lever 56 is operated manually or by foot by suppressing the handle 70. Thus, also in this case, the backwash bulb 7 is of the type that it is manually compressible; however, by convenience, it is compressed manually by the lever 56. In alternative embodiments, no lever is mounted, and the bulb 7 is to be compressed by hand directly.

During backwashing, the backwash water flows through the filtration unit 5 in reverse, exits the filtration unit 5 at the upstream inlet 19 and flows backwards into the tube 49 that connects the dirt water container 2 with the filtration unit 5.

Figure 11:
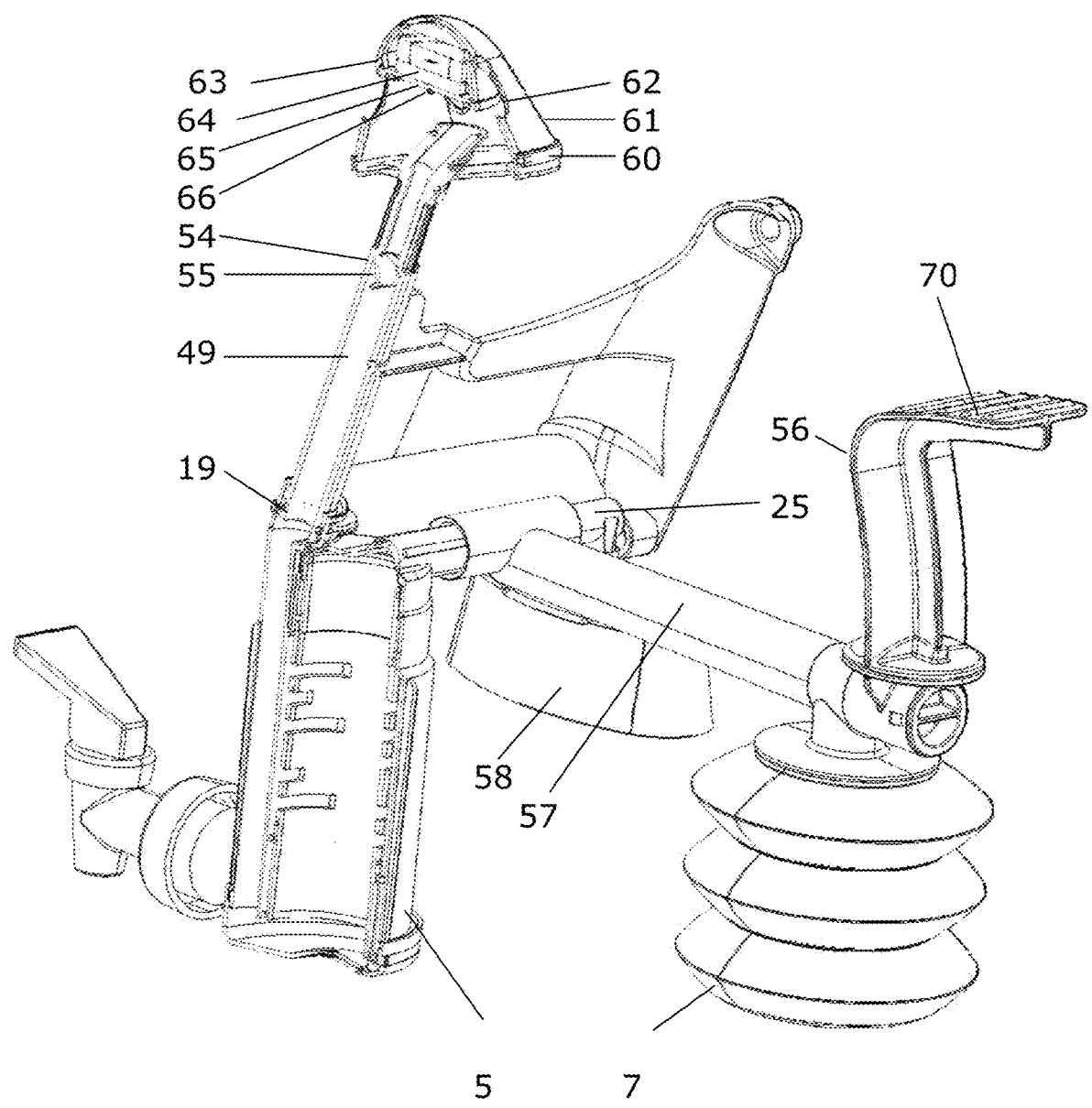
FIG. 11 is a sectional drawing illustrating the water flow and an antimicrobial source.

The flow path is illustrated in greater detail in FIG. 11. In order to prevent the backwash water to reach the dirt water container 2, a check valve 54 with a ball 55 is arranged in the tube 49. When water flows downwards in the tube 49, during normal gravity filtering, water can pass around the ball 55. In contrast thereto, during backwash, the ball 55 is pressed upwards against its seat 55A and closes for the further flow upwards of the backwash water.

Instead, the backwash water leaves the tube 49 through a side exit 59, as illustrated in FIG. 8b. The side exit 59 from tube 49 has a tube connection (not shown) connected to the dirt water receptacle 8 for receiving the backwash water from the tube 49.

The antimicrobial unit 60 is shown in greater detail in FIG. 11. Under the cover 61, a sealed compartment 63 is provided for an antimicrobial source 64. The sealed compartment 63 is sealed against water entering the sealed compartment 63. However, it is not hermetically sealed, as it is provided with a very narrow bottom pin hole 66 through which antimicrobial can escape in gas form from the sealed compartment 64 and enrich the dirt water, for example to less than 1 ppm, for example between 0.1 and 1 ppm. For example, the antimicrobial source 64 is provided as a chlorine tablet which slowly evaporates out of the pin hole 66. The pin hole 66 is of a diameter preventing water to enter the pinhole due to surface tension of the water. For example, the diameter is in the range of 0.6-1.5 mm. In order to secure the pin hole further against water entering the sealed compartment 63, the pin hole is optionally provided with a hydrophobic surface.

As an alternative or additional measure to protect the antimicrobial source, for example chlorine tablet, from contact with water, but allow evaporation thereof, the antimicrobial source can be enclosed by a gas permeable but water impermeable enclosure. For example, such enclosure is a porous hydrophobic material. Examples of such materials are hydrophobic, open celled foams or hydrophobic woven or non-woven fabrics.

Aspects

In the following a number of interrelated aspects are described.

Aspect 1. A device (1) for water purification, the device (1) comprising a dirt water container (2) for accumulating dirt water and a purification unit (5) for purifying the dirt water, wherein the dirt water container (2) is arranged above the purification unit (5) for driving water through the purification unit (5) by gravity;

wherein the purification unit (5) comprises a filter housing (5') enclosing a purification medium that is separating an upstream side of the purification unit (5) from a downstream side of the purification unit (5) such that water in the purification unit (5) can flow from the upstream side to the downstream side only through the purification medium;

wherein the dirt water container (2) has a container outlet (10), and the filter housing (5') has an upstream inlet (19) to the upstream side, wherein the container outlet (10) and the upstream inlet (19) are fluid-flow-connected by a first flow connector (9) for receiving dirt water from the dirt water container (2) into the upstream side of the purification unit (5);

wherein the device comprises a clean water tank (3) fluid-flow connected to the downstream side through a downstream outlet (29A) for receiving purified water from the downstream side.

Aspect 2. A device according to aspect 1, wherein the purification unit (5) is a filtration unit (5) and the purification medium is a microporous filtration membrane.

Aspect 3. A device according to aspect 2, wherein the filtration unit (5) has an upstream outlet (23) in the filter housing (5') for outlet of fluid from the upstream side, wherein a vent tube (12) is connected to the upstream outlet (23), the vent tube (12) extending up-wards and having a vent opening (22) into atmosphere for venting of air from the up-stream side, wherein the vent opening (22) is provided at a level closer to a top than to a bottom (16) of the dirt water container (2).

Aspect 4. A device according to aspect 3, wherein the vent opening (22) is provided at a reference height, the reference height being at most 5 cm from an upper edge (14) of the dirt water container (2).

Aspect 5. A device according to aspect 3 or 4, wherein the vent tube (12) extends upwards outside the dirt water container (2) and outside the clean water tank (3) and has a vent opening (22) into atmosphere outside the dirt water container (2).

Aspect 6. A device according to aspect 5, wherein an upper part (25) of the vent tube (12) is attached to an outer side of the dirt water container (2).

Aspect 7. A device according to any one of the aspects 3-6, wherein the device comprises a manually compressible backwash bulb (7) that is fluid-flow connected to the downstream side for receiving of clean water in the backwash bulb (7) for backwash purposes; wherein a backwash tube (12, 12A) is provided which is connected to the up-stream side for receiving contaminated backflush water and connected to a backwash receptacle (8) for dispensing the contaminated backwash water into the backwash receptacle when water is pressed from the downstream side through the membrane to the upstream side by compression of the backwash bulb and further from the upstream side through the backwash tube (12, 12A) into the backwash receptacle (8), wherein the backwash tube (12, 12A) is an integral part of the vent tube (12) for venting air from the upstream side and dispensing backwash water through the same tube (12, 12A).

Aspect 8. A device according to aspect 2, wherein the device comprises a manually compressible backwash bulb (7) that is fluid-flow connected to the downstream side for receiving of clean water in the backwash bulb (7) for backwash purposes; wherein a back-wash tube (12, 12A) is provided which is connected to the upstream side for receiving contaminated backflush water from the filtration unit (5) and connected to a backwash receptacle (8) for dispensing the contaminated backwash water into the backwash receptacle when water is pressed from the downstream side through the membrane to the upstream side by compression of the backwash bulb and further from the upstream side through the backwash tube (12, 12A) into the backwash receptacle (8).

Aspect 9. A device according to aspect 7 or 8, wherein the backwash tube (12A) is connected to the backwash receptacle (8) through a fluid entrance (8A) of the backwash receptacle, the fluid entrance being surrounded by multiple holes 8B for preventing drinking therefrom.

Aspect 10. A device according to any one of the aspects 7-9, wherein the backwash receptacle (8) is provided at a level lower than the filtration unit (5).

Aspect 11. A device according to any one of the aspects 7-10, wherein a one way check valve is provided between the dirt water container (2) and the upstream side of the filtration unit (5) for preventing backwash water to be pressed into the dirt water container (2).

Aspect 12. A device according to any one of the aspects 3-11, wherein the filtration unit (5) is elongate tubular with a longitudinal axis that is horizontal or oriented at most 45 degrees from a horizontal plane when the filtration unit (5) is in proper orientation for water filtration.

Aspect 13. A device according to aspect 12, wherein, when the filtration unit (5) is in proper orientation for water filtration, filtered water is dispensed from the downstream side through a downstream outlet (29A), wherein the downstream outlet (29A) is provided at a level above any uppermost microporous surface of the microporous filtration membrane for maintaining a water level in the filtration unit (5) above the uppermost microporous surface.

Aspect 14. A device according to aspect 2, wherein the filtration unit (5) is elongate tubular with a longitudinal axis that is horizontal or oriented at most 45 degrees from a horizontal plane when the filtration unit (5) is in proper orientation for water filtration, wherein, when the filtration unit (5) is in proper orientation for water filtration, filtered water is dispensed from the downstream side through a downstream outlet (29A), wherein the downstream outlet (29A) is provided at a level above any uppermost microporous surface of the microporous filtration membrane for maintaining a water level in the filtration unit (5) above the uppermost microporous surface.

15. A device according to any one of the aspects 12-14, wherein the longitudinal axis that is horizontal or oriented at most 10 degrees from a horizontal plane when the filtration unit (5) is in proper orientation for water filtration, Aspect 16. A device according to any one of the aspects 2-13, wherein the device (1) comprises a distributor (25), the distributor (25) comprising an inlet channel (29) for receiving filtered water from the downstream side, a first distributor outlet (20) for dispensing filtered water to a compressible backwash bulb (8), and a second distributor outlet (30) for providing filtered water into the clean water tank (3), the distributor (25) further comprising a one-way check valve (26A, 26B, 32) arranged between the first distributor outlet (20) and the second distributor outlet (30) for preventing back-wash water from the compressible backwash bulb from entering the clean water tank (3) when water is forced backwards through the first distributor outlet (20) due to compression of the backwash bulb (8).

Aspect 17. A device according to aspect 16, wherein the check valve is a ball valve, comprising a valve housing (26A) containing a ball (26B) and with a ball seat (32) in a wall of the valve housing (26A) on a side adjacent to the second distributor outlet (30) and remote to the first distributor outlet (20).

Aspect 18. A device according to any one of the aspects 2-17, wherein the filtration unit (5) comprises a plurality of microporous hollow fibre membranes.

Aspect 19. A device according to aspect 18, wherein the hollow fibre membranes are arranged in parallel and potted at both ends in a resin.

Aspect 20. A device according to aspect 18 or 19, wherein the filtration unit comprises an additional filtration medium downstream of the hollow fibre membranes, the addition-al filtration medium being a fibrous matrix containing electro-positive adsorptive nano-particles.

Aspect 21. A device according to aspect 20, wherein the hollow fibre membranes are microfiltration membranes.

Aspect 22. A device according to any preceding aspect, wherein the dirt water container (2) is arranged above the clean water tank (2) and with a clearance of at least 5 cm between the clean water tank (3) and the dirt water container (2).

Aspect 23. A device according to any preceding aspect, wherein the clean water tank has an upper, closed top and the dirt water container has a closed bottom, and wherein the purification unit is arranged between the closed top of the clean water tank and the closed bottom of the dirt water container (2).

Aspect 24. A device according to any preceding aspect, wherein the purification unit (5) is arranged only in a space outside and above the clean water tank (3) and only outside and below the dirt water container (2).

Aspect 25. A device according to any preceding aspect, wherein the device is a portable device with dry weight of less than 30 kg, with a volume of the dirt water container of less than 30 litres, and with a volume of the clean water tank of less than litres.

Aspect 26. A device according to any preceding aspect, wherein the clean water tank (2) has an enclosure sealed against the environment.

Aspect 27. A device according to any preceding aspect, wherein the device (1) has a connection (36, 36') between the clean water tank (3) and the dirt water container (2), the connection (26, 26') comprising means (37, 38, 47, 48) for varying the distance between the clean water tank (3) and the dirt water container (2).

Aspect 28. A device according to aspect 27, wherein the connection (36, 36') has a first state where the clean water tank (3) and the dirt water container (2) are in a close position, which is a storage or transport state, and the connection (36, 36') has a second state where the clean water tank (3) and the dirt water container (2) are in a remote condition, which is an operational condition for water filtration, where the distance between the clean water tank and the dirt water container in the second condition is between 5 cm and 100 cm larger than in the close position.

Aspect 29. A device according to aspect 27 or 28, wherein the means for varying the distance comprises a set of profiles (37) in sliding cooperation with the outer side (38) of the clean water tank (3) or the outer side of the dirt water container (2) or both.

Aspect 30. A device according to aspect 29, wherein the clean water tank (3) has grooves (38) on its outer side which take up the profiles (37) in sliding cooperation.

Aspect 31. A device according to aspect 27 or 28, wherein the means for varying the distance comprises a rotationally hinged (42) profile (47) with an angle varying relatively to the clean water tank (3) in dependency of the distance between the clean water tank (3) and the dirt water container (2).

Aspect 32. A device according to aspect 31, wherein the profile (47) is hinged in a first hinge (43, 44) at the clean water tank (3) and is hinged in a second hinge (42) at the dirt water container (3).

Aspect 33. A device according to aspect 31 or 32, wherein the dirt water container (2) has an upper opening (2') which is dimensioned larger than a cross section of the clean water tank in order to partly enclose the clean water tank inside the dirt water container (3) in storage condition Aspect 34. A device according to any one of the aspects 1-26, wherein an intermediate module (4) is provided having a cross sectional dimension in the horizontal plane corresponding to cross sectional dimensions of the dirt water container (2) and the clean water tank (3), wherein the intermediate module (4) is supported by the clean water tank (3) and, in turn, supports the dirt water container when in stacked conditions, wherein the dirt water container (2), the intermediate module (4) and the clean water tank (3) in such stacked conditions form an integrated three-module system

NUMBER LIST

1—device
2—dirt water container
3—clean water tank
4—intermediate module
5—filtration unit
5'—filter housing
6—cavity in clean water tank enclosure for backwash bulb
7—backwash bulb
8—backwash receptacle
8A—opening in the backwash receptacle for receiving backwash water
8B—holes surrounding the opening 8A
8C—upper surface of backwash receptacle 8
9—cavity in clean water tank enclosure for backwash receptacle
10—container outlet
11—hose between backwash bulb 7 and filtration unit 5 (third flow connector)
12—vent tube
12A—backwash tube
13—uppermost part of the backwash tube/vent tube
14—upper edge of dirt water container
15—elevated part of container outlet
16—bottom of dirt water container
17—lid of dirt water container
18—closure member in lid 17
19—upstream inlet in filter housing
20—first distributor outlet from distributor to backwash bulb 7
21—snap connectors for vent tube 12
22—vent opening
23—upstream outlet from filter housing
24—tap
25—distributor (second flow connector)
26—valve housing
26A—valve opening covered by cover 27
26B—ball
27—cover for opening 26A of ball valve housing 26
28A—vent valve
28B—vent valve channel
29—inlet channel in distributor
29A—downstream outlet from outlet side
30—second distributor outlet from distributor 25 to clean water tank 3
31—agent reservoir
32—ball seat
33—sloping upper surface of clean water tank 3
34—prefilter
35—lid of clean water tank 3
36—connector
37—connector profile
38—grooves in clean water tank 3 cooperating with connector profile 37
39—platform support for dirt water container 2
40—snap connectors of lid 35
41—compartment for filtration unit 5 on top of clean water tank 3
42—hinge between connection 36' and dirt water container 2
42A, 42B—first and second hinge parts between connection 36' and dirt water container 2
43—third hinge part between connection 36' and dirt water tank 2
44—groove in lid 35 for third hinge part 43
45—fourth hinge part between lid 35 and second part 48 of connection 36'
46—bushing in clean water lid 35 for fourth hinge part 45
47—first part of connection 36'
48—second part of connection 36'
49—tube between dirt water tank 2 and filtration unit 5 (first flow connector)

50—hollow fibre microporous membranes, for example microfiltration membranes
51—potting of the membranes
52—upstream side
53—downstream side
54—check valve for preventing backflow into dirt water container 2
55—ball for check valve 54
55A—seat for ball 55
56—lever for compressing backwash bulb 7
57—lever tube between backwash bulb 7 and filtration unit 5 (third flow connector)
58—floater for shutting off flow from second distributor outlet 30
59—side exit from tube 49 for connection to dirt water receptacle 8
60—antimicrobial unit for adding antimicrobial to the dirt water
61—cover of antimicrobial unit 60
62—dirt water entrance openings of antimicrobial unit 60
63—sealed compartment for antimicrobial source 64
64—antimicrobial source
65—bottom of sealed compartment 63
66—pinhole in bottom 65 of sealed compartment
67—channel from upstream inlet 19 of filter housing 5' to opposite end
68—U-bent hollow membrane fibres
69—run down channel in filtration unit 5
70—handle of the lever 56.

The invention claimed is:

1. A portable device (1) for water purification, the device (1) comprising a dirt water container (2) for accumulating dirt water and a purification unit (5) for purifying the dirt water, wherein the dirt water container (2) is arranged above the purification unit (5) for driving water through the purification unit (5) by gravity; wherein the purification unit (5) comprises a filter housing (5') enclosing a purification medium that is separating an upstream side (52) of the purification unit (5) from a downstream side (53) of the purification unit (5) such that water in the purification unit (5) can flow from the upstream side (52) to the downstream side (53) only through the purification medium; the filter housing (5') having a downstream outlet (29A) from the downstream side (53); wherein the purification unit (5) is a filtration unit (5) and the purification medium is a microporous filtration membrane; wherein the dirt water container (2) has a container outlet (10), and the filter housing (5') has an upstream inlet (19) to the upstream side, wherein the container outlet (10) and the upstream inlet (19) are fluid-flow-connected by a first flow connector (9) for receiving dirt water from the dirt water container (2) into the upstream side of the purification unit (5); wherein the device comprises a clean water tank (3) fluid-flow connected to the downstream side (53) through the downstream outlet (29A) for receiving purified water from the downstream side (53), wherein a backwash tube (12, 12A) is provided which is connected to the upstream side (52) for receiving contaminated backwash water from the upstream side (52) of the filtration unit (5) and connected to a backwash receptacle (8) for dispensing the backwash water into the backwash receptacle (8) when water is pressed from the downstream side (53) of the filtration unit (5) through the membrane to the upstream side (52) by compression of a backwash bulb (7) and further from the upstream side (52) through the backwash tube (12, 12A) into the backwash receptacle (8); wherein the backwash receptacle (8) is different and separate from the dirt water container (2) and tube-connected only to the filter housing (5'), and wherein the backwash receptacle is configured so that it is detachable from the backwash tube and is emptyable and replaceable.

2. The device according to claim 1, wherein a one way check valve (54) is provided between the dirt water container (2) and the upstream side (52) of the filtration unit (5) for preventing backwash water to be pressed into the dirt water container (2).

3. The device according to claim 1, wherein the filtration unit (5) has an upstream outlet (23) in the filter housing (5') for outlet of fluid from the upstream side, wherein a vent tube (12) is connected to the upstream outlet (23) for venting of air from the filter housing (5') through the upstream outlet (23) and into the vent tube (12) when dirt water enters the filter housing (5') through the upstream inlet (19), the vent tube (12) extending upwards and having a vent opening (22) into atmosphere for venting of air from the upstream side and from the vent tube, wherein the vent opening (22) is provided at a level closer to a top than to a bottom (16) of the dirt water container (2) for preventing dirt water to flow from the filter housing (5') through the upstream outlet (23) through the vent tube (12) and out of the vent opening (22), wherein the backwash tube (12, 12A) is an integral part of the vent tube (12) for venting air from the upstream side and dispensing backwash water from the upstream outlet (23) through the backwash tube (12, 12A) into the back wash receptacle (8).

4. A portable device (1) for water purification, the device (1) comprising a dirt water container (2) for accumulating dirt water and a purification unit (5) for purifying the dirt water, wherein the dirt water container (2) is arranged above the purification unit (5) for driving water through the purification unit (5) by gravity; wherein the purification unit (5) comprises a filter housing (5') enclosing a purification medium that is separating an upstream side (52) of the purification unit (5) from a downstream side (53) of the purification unit (5) such that water in the purification unit (5) can flow from the upstream side (52) to the downstream side (53) only through the purification medium; the filter housing (5') having a downstream outlet (29A) from the downstream side (53); wherein the purification unit (5) is a filtration unit (5) and the purification medium is a microporous filtration membrane; wherein the dirt water container (2) has a container outlet (10), and the filter housing (5') has an upstream inlet (19) to the upstream side, wherein the container outlet (10) and the upstream inlet (19) are fluid-flow-connected by a first flow connector (9) for receiving dirt water from the dirt water container (2) into the upstream side of the purification unit (5); wherein the device comprises a clean water tank (3) fluid-flow connected to the downstream side (53) through the downstream outlet (29A) for receiving purified water from the downstream side (53), wherein the filtration unit (5) has an upstream outlet (23) in the filter housing (5') for outlet of fluid from the upstream side, wherein a vent tube (12) is connected to the upstream outlet (23) for venting of air from the filter housing (5') through the upstream outlet (23) and into the vent tube (12) when dirt water enters the filter housing (5') through the upstream inlet (19), the vent tube (12) extending upwards and having a vent opening (22) into atmosphere for venting of air from the upstream side and the vent tube, and wherein the vent opening (22) is provided at a level closer to a top than to a bottom (16) of the dirt water container (2) for preventing dirt water to flow from the filter housing (5') through the upstream outlet (23) through the vent tube (12) and out of the vent opening (2), wherein a one way check valve (54) is provided between the dirt water container (2)

and the upstream side (52) of the filtration unit (5) for preventing backwash water from being pressed into the dirt water container (2) when backwash water is pressed through the filter and through the upwardly extending vent tube and into the backwash receptacle.

5. A portable device (1) for water purification, the device (1) comprising a dirt water container (2) for accumulating dirt water and a purification unit (5) for purifying the dirt water, wherein the dirt water container (2) is arranged above the purification unit (5) for driving water through the purification unit (5) by gravity; wherein the purification unit (5) comprises a filter housing (5') enclosing a purification medium that is separating an upstream side (52) of the purification unit (5) from a downstream side (53) of the purification unit (5) such that water in the purification unit (5) can flow from the upstream side (52) to the downstream side (53) only through the purification medium; the filter housing (5') having a downstream outlet (29A) from the downstream side (53); wherein the purification unit (5) is a filtration unit (5) and the purification medium is a microporous filtration membrane; wherein the dirt water container (2) has a container outlet (10), and the filter housing (5') has an upstream inlet (19) to the upstream side, wherein the container outlet (10) and the upstream inlet (19) are fluid-flow-connected by a first flow connector (9) for receiving dirt water from the dirt water container (2) into the upstream side of the purification unit (5); wherein the device comprises a clean water tank (3) fluid-flow connected to the downstream side (53) through the downstream outlet (29A) for receiving purified water from the downstream side (53), and wherein the dirt water container (2) is rigid, wherein the clean water tank (3) is rigid, wherein the device (1) has a modular build-up with mutually stackable dirt water container (2), intermediate module (4), and clean water tank (3), wherein the intermediate module (4) is supported by the clean water tank (3) and, in turn, supports the dirt water container (2) when in stacked condition to form an integrated three-module system, wherein the dirt water container (2) is arranged above the clean water tank (2) and with a clearance of at least 5 cm between the clean water tank (3) and the dirt water container (2), wherein the filtration unit (5) has an upstream outlet (23) in the filter housing (5') for outlet of fluid from the upstream side (52), wherein a vent tube (12) is connected to the upstream outlet (23) for venting of air from the filter housing (5') through the upstream outlet (23) and into the vent tube (12) when dirt water enters the filter housing (5') through the upstream inlet (19), the vent tube (12) extending upwards and having a vent opening (22) into atmosphere for venting of air from the upstream side and the vent tube, and wherein the vent opening (22) is provided at a level closer to a top than to a bottom (16) of the dirt water container (2) for preventing dirt water to flow from the filter housing (5') through the upstream outlet (23) through the vent tube (12) and out of the vent opening (22).

6. The device according to claim 5, wherein the device is a portable device with dry weight of less than 30 kg, with a volume of the dirt water container of less than 30 liters, and with a volume of the clean water tank of less than 30 litres.

* * * * *